US011754721B2

(12) United States Patent
Amelot et al.

(10) Patent No.: US 11,754,721 B2
(45) Date of Patent: *Sep. 12, 2023

(54) VISUALIZATION AND SEMANTIC MONITORING USING LIDAR DATA

(71) Applicant: Ouster, Inc., San Francisco, CA (US)

(72) Inventors: Pierre Amelot, San Francisco, CA (US); Daniel Lu, San Francisco, CA (US); Angus Pacala, San Francisco, CA (US); Kairen Wong, San Mateo, CA (US)

(73) Assignee: Ouster, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,662

(22) Filed: Aug. 9, 2022

(65) Prior Publication Data

US 2022/0390610 A1 Dec. 8, 2022

Related U.S. Application Data

(63) Continuation of application No. 16/808,988, filed on Mar. 4, 2020, now Pat. No. 11,422,265.

(Continued)

(51) Int. Cl.
*G01S 17/894* (2020.01)
*G01S 17/931* (2020.01)
(Continued)

(52) U.S. Cl.
CPC ............ *G01S 17/894* (2020.01); *B60W 40/04* (2013.01); *B60W 50/14* (2013.01); *G01S 7/51* (2013.01);
(Continued)

(58) Field of Classification Search
CPC ......... G06T 7/90; G06T 7/521; G06T 7/0046; G06T 15/50; G06T 17/05; G06T 19/20;
(Continued)

(56) References Cited

U.S. PATENT DOCUMENTS 6,088,648 A 7/2000 Shah et al.
8,917,169 B2 12/2014 Schofield et al.
(Continued)

FOREIGN PATENT DOCUMENTS

WO 2018016088 A1 1/2018
WO 2018039432 A1 3/2018
WO 2019113531 A1 6/2019

OTHER PUBLICATIONS

U.S. Appl. No. 16/213,784, Notice of Allowance, dated Aug. 21, 2019, 9 pages.
(Continued)

*Primary Examiner* — Hoa Q Pham
(74) *Attorney, Agent, or Firm* — Kilpatrick Townsend & Stockton LLP

(57) ABSTRACT

Methods are provided for using a light ranging system. A computing system receives, from light ranging devices, ranging data including distance vectors to environmental surfaces. A distance vector can correspond to a pixel of a three-dimensional image stream. The system can identify a pose of a virtual camera relative to the light ranging devices. The light ranging devices are separated from the pose by first vectors that are used to translate some of the distance vectors using the first vectors. The system may determine colors associated with the translated distance vectors and display pixels of the three-dimensional image stream using the colors at pixel positions specified by the translated distance vectors. The system may use one or more models with the ranging data to provide semantic labels that describe a region that has been, or is likely to be, in a collision.

22 Claims, 16 Drawing Sheets

Related U.S. Application Data

(60) Provisional application No. 62/813,699, filed on Mar. 4, 2019.

(51) Int. Cl.
    *B60W 50/14*         (2020.01)
    *B60W 40/04*         (2006.01)
    *G01S 7/51*           (2006.01)

(52) U.S. Cl.
CPC ...... *G01S 17/931* (2020.01); *B60W 2050/146* (2013.01)

(58) Field of Classification Search
CPC ........ G01S 17/02; G01S 17/88; G01S 17/894; G01S 17/89; G01S 17/936; G01S 17/42; G01S 7/4802; G01S 7/51; G01S 7/4815; G01S 7/4865; G01S 7/4808; G06K 9/00805; G06K 9/00812; G06K 9/6256; G06K 9/6262
USPC .... 356/4.01, 601–623; 340/425.5, 438, 937; 348/148, 151; 701/117, 2, 23, 519
See application file for complete search history.

(56) References Cited

U.S. PATENT DOCUMENTS

| | | | |
|---|---|---|---|
| 10,520,593 | B2 | 12/2019 | Pacala et al. |
| 10,983,217 | B2 | 4/2021 | Nezhadarya et al. |
| 11,422,265 | B2 * | 8/2022 | Amelot ................ B60W 50/14 |
| 2013/0090781 | A1 | 4/2013 | Gellatly et al. |
| 2015/0219764 | A1 | 8/2015 | Lipson |
| 2015/0347840 | A1 | 12/2015 | Iida |
| 2016/0082953 | A1 | 3/2016 | Teller et al. |
| 2016/0259038 | A1 | 9/2016 | Retterath et al. |
| 2017/0008521 | A1 | 1/2017 | Braunstein et al. |
| 2017/0110022 | A1 | 4/2017 | Gulash |
| 2017/0177954 | A1 | 6/2017 | Micks et al. |
| 2018/0188043 | A1 | 7/2018 | Chen et al. |
| 2018/0288586 | A1 | 10/2018 | Tran et al. |
| 2018/0370552 | A1 | 12/2018 | Puttagunta et al. |
| 2019/0179029 | A1 | 6/2019 | Pacala et al. |
| 2019/0179320 | A1 | 6/2019 | Pacala et al. |

OTHER PUBLICATIONS

U.S. Appl. No. 16/808,988, Notice of Allowance, dated Apr. 13, 2022, 15 pages.
Alismail et al., "Continuous Trajectory Estimation for 3D SLAM from Actuated Lidar", IEEE International Conference on Robotics and Automation (ICRA), May 2014, pp. 6096-6101.
Anderson et al., "Relative Continuous-Time SLAM", The International Journal of Robotics Research, vol. 34, No. 12, Aug. 21, 2015, pp. 1453-1479.
Barfoot et al., "Batch Continuous-Time Trajectory Estimation as Exactly Sparse Gaussian Process Regression", Robotics: Science and Systems, Jul. 14, 2014, 9 pages.
Dube et al., "Non-uniform Sampling Strategies for Continuous Correction Based Trajectory Estimation", IEEE International Conference on Robotics and Automation (ICRA), May 2016, pp. 4792-4798.
Geiger et al., "Vision Meets Robotics: the KITTI Dataset", The International Journal of Robotics Research, vol. 32, No. 11, 2013, pp. 1231-1237.
Kaul et al., "Continuous-Time Three-Dimensional Mapping for Micro Aerial Vehicles with a Passively Actuated Rotating Laser Scanner", Journal of Field Robotics, vol. 33, No. 1, Jul. 2015, pp. 1-30.
Kohler et al., "Cartographer is a System that Provides Real-Time Simultaneous Localization and Mapping (Slam) in 2D and 3D Across Multiple Platforms and Sensor Configurations", Available Online at: https://github.com/googlecartographer/cartographer, Oct. 2016, 3 pages.
Magnusson et al., "The Three-Dimensional Normal-Distributions Transform: An Efficient Representation for Registration, Surface Analysis, and Loop Detection", Doctoral Dissertation, Orebro University, 2009, 221 pages.
Application No. PCT/US2018/064597, International Search Report and Written Opinion, dated May 6, 2019, 24 pages.
PCT/US2018/064597, "Invitation to Pay Additional Fees and, Where Applicable, Protest Fee", dated Feb. 4, 2019, 2 pages.
Application No. PCT/US2020/021010, International Preliminary Report on Patentability, dated Sep. 16, 2021, 11 pages.
Application No. PCT/US2020/021010, International Search Report and Written Opinion, dated Jul. 23, 2020, 14 pages.
PCT/US2020/021010, "Invitation to Pay Additional Fees and, Where Applicable, Protest Fee", dated May 19, 2020, 2 pages.
Pendleton et al., "Perception, Planning, Control, and Coordination for Autonomous Vehicles", Machines, vol. 5, No. 1, Feb. 17, 2017, 54 pages.
Pomerleau et al., "A Review of Point Cloud Registration Algorithms for Mobile Robotics", Foundations and Trends in Robotics, vol. 4, No. 1, May 2015, pp. 1-104.
Segal et al., "Generalized-ICP", Robotics: Science and Systems, vol. 2, No. 4, Jun. 2009, 8 pages.
Stoyanov et al., "Fast and Accurate Scan Registration through Minimization of the Distance between Compact 3D NDT Representations", The International Journal of Robotics Research, vol. 31, No. 12, Sep. 24, 2012, pp. 1377-1393.
Tam et al., "Registration of 3D Point Clouds and Meshes: A Survey from Rigid to Non-Rigid", IEEE Transactions on Visualization and Computer Graphics, vol. 19, No. 7, Jul. 2013, 20 pages.
Zhang et al., "LaserOdometry.cpp", Available Online at: http:1/web.archive.org/web/20160728191133/http:1locs.ros.org/indigo/api/loam_velodyne/html/laserOdometry8cppsource.htmlhtt;:1/docs.ros.org/indigo/api/1oamvelodyne/html/laser0dometry8ccpsource.html., Nov. 2014, 23 pages.
Zhang et al., "LOAM: Lidar Odometry and Mapping in Realtime", In Robotics: Science and Systems, vol. 2, Jul. 2014, 9 pages.
Zlot et al., "Efficient Large-Scale Three-Dimensional Mobile Mapping for Underground Mines", Journal of Field Robotics, vol. 31, No. 5, Mar. 5, 2014, pp. 758-779.

\* cited by examiner

```
┌─────────────────────────────────────────────────────────────┐
│ Store A Primary Model Of An Exterior Of A Vehicle, The Model│
│ Comprising A Set Of Three-Dimensional Points Corresponding  │
│ To A Plurality Of Regions On The Exterior Of The Vehicle 702│
└─────────────────────────────────────────────────────────────┘
                            │
                            ▼
┌─────────────────────────────────────────────────────────────┐
│ Store A Semantic Label In Association With A Subset Of      │
│ Points Of The Primary Model That Define Each Region 704     │
└─────────────────────────────────────────────────────────────┘
                            │
                            ▼
┌─────────────────────────────────────────────────────────────┐
│ Perform One Or More Measurements Of The Exterior Of The     │
│ Vehicle To Generate Ranging Data That Includes Distances    │
│ From The Exterior Of The Vehicle To The One Or More Light   │
│ Ranging Devices 706                                         │
└─────────────────────────────────────────────────────────────┘
                            │
                            ▼
┌─────────────────────────────────────────────────────────────┐
│ Construct One Or More Secondary Models Of The Exterior Of   │
│ The Vehicle Using The Ranging Data 708                      │
└─────────────────────────────────────────────────────────────┘
                            │
                            ▼
┌─────────────────────────────────────────────────────────────┐
│ Compare The One Or More Secondary Models With The Primary   │
│ Model To Detect A First Point Having A Change In The        │
│ Exterior Of The Vehicle 710                                 │
└─────────────────────────────────────────────────────────────┘
                            │
                            ▼
┌─────────────────────────────────────────────────────────────┐
│ Determine That The First Point Is Within A First Region Of  │
│ The Plurality Of Regions 712                                │
└─────────────────────────────────────────────────────────────┘
                            │
                            ▼
┌─────────────────────────────────────────────────────────────┐
│ Retrieve A First Semantic Label Associated With The First   │
│ Region 714                                                  │
└─────────────────────────────────────────────────────────────┘
                            │
                            ▼
┌─────────────────────────────────────────────────────────────┐
│ Provide A Notification Including The First Sematic Label 716│
└─────────────────────────────────────────────────────────────┘
```

VISUALIZATION AND SEMANTIC MONITORING USING LIDAR DATA

CROSS-REFERENCE TO RELATED APPLICATION

The present application is a continuation of U.S. Non-Provisional application Ser. No. 16/808,988, filed on Mar. 4, 2020, which claims priority U.S. Provisional Application No. 62/813,699, filed Mar. 4, 2019, the entire contents of which is herein incorporated by reference for all purposes.

BACKGROUND

Light ranging systems, such as light detection and ranging (LiDAR) systems, may be used to assist with the operations of a vehicle, such as a driver-operated vehicle or a self-driving vehicle. A LiDAR system measures the distance to an object by irradiating a landscape with pulses from a laser, and then measuring the time for photons to travel to an object and return after reflection, as measured by a receiver of the LiDAR system. A distance to an object can be determined based on time-of-flight from transmission of a pulse to reception of a corresponding reflected pulse.

More uses of LiDAR would be beneficial. Vehicle collisions are a significant problem, and drivers seek improved technologies for alerting of a potential collision. Embodiments of the present disclosure solve these problems and others.

BRIEF SUMMARY

According to some embodiments, a vehicle ranging system installed on a vehicle is used to provide images to a driver of the vehicle. One or more light ranging devices can provide a three-dimensional image stream (e.g., point clouds) that represents the environment. A virtual camera can be positioned within a three-dimensional (3D) representation of the environment. A change in the pose of the virtual camera can be received at a triggering device, resulting in a new pose being selected for the virtual camera (e.g., to change from a top-down view to a side view when turning). The pose of the virtual camera can be separated or offset from the vehicle, e.g., pointing at the vehicle. In this manner, a display, such as an in-cab display, can provide a dynamic display of the environment at various angles that are not possible with a camera.

According to other embodiments, a light ranging system can detect a part of a vehicle that may need inspection and notify a user of the part (e.g., a side door or bumper). The system can store a model of the vehicle, where the model comprises regions (e.g., a subset of points) on the exterior of a vehicle. The regions can be assigned semantic labels, such as a side door or bumper. The detection of a region to be inspected can be performed in various ways. In some implementations, the model can be used to detect a proximity breach to the vehicle while the vehicle is being driven. A semantic label associated with an identified region can be retrieved from memory, and a notification with the semantic label can be provided. In other implementations, one or more secondary models can be constructed and compared to the model to detect a point having a change in the exterior of the vehicle. A notification with a semantic label can then be provided.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

FIG. 7 is a flowchart illustrating a method for monitoring a vehicle using semantic labeling with vehicle models, according to some embodiments.

TERMS

Figure 1:
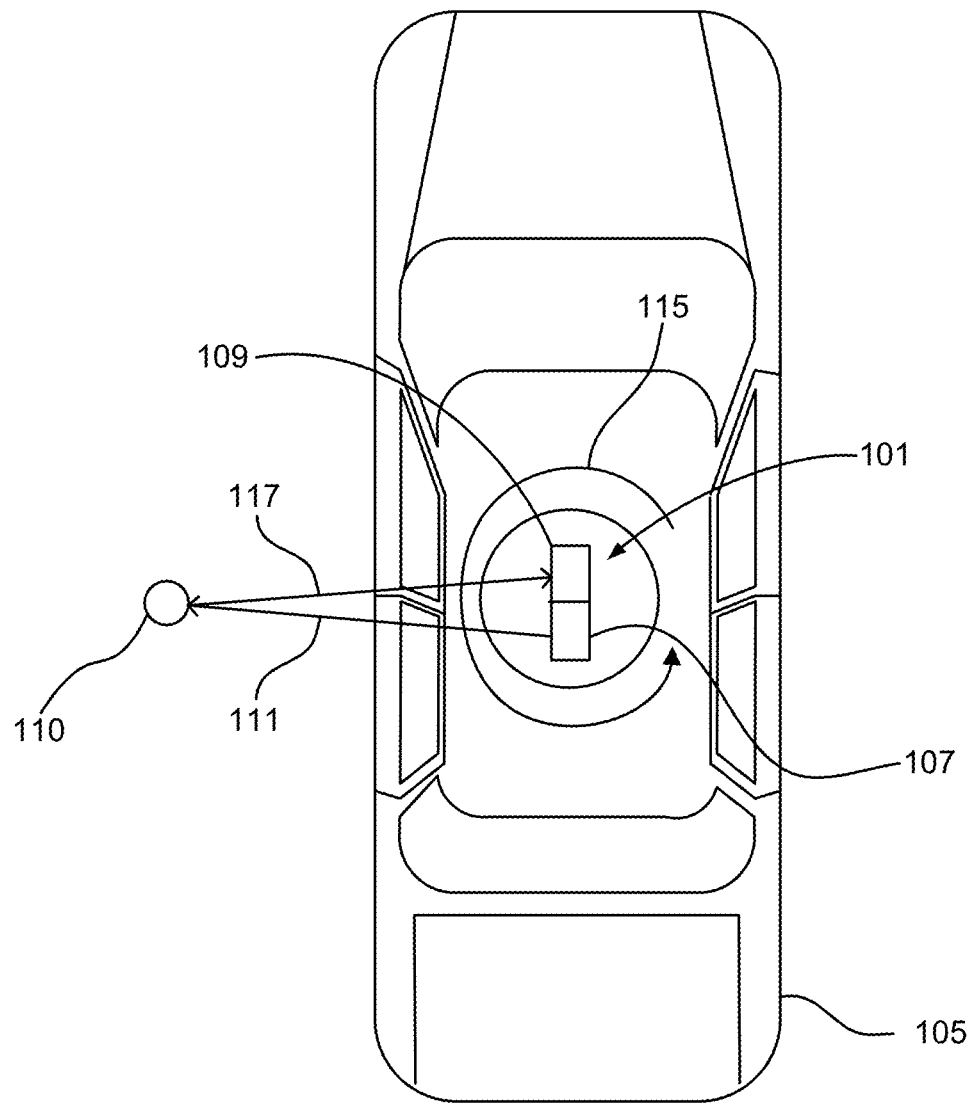
FIG. 1 shows an example of a light ranging system having a scanning LiDAR device installed on top of a vehicle according to some embodiments.

The following terms may be helpful for describing embodiments of the present technology.

The term "ranging," particularly when used in the context of methods and devices for measuring an environment and assisting with vehicle operations, may refer to determining a 2D or 3D distance or a distance vector from one location or position to another location or position. "Light ranging" may refer to a type of ranging method that makes use of electromagnetic waves to perform ranging methods or functions. Accordingly, a "light ranging device" may refer to a device for performing light ranging methods or functions. "LiDAR" (also "lidar" or "LIDAR") may refer to a type of light ranging method that measures a distance to a target by illuminating the target with a pulsed laser light, and thereafter measure the reflected pulses with a sensor. Accordingly, a "LiDAR device" or "LiDAR system" may refer to a type of light ranging device for performing LiDAR methods or functions. A "light ranging system" may refer to a system comprising at least one light ranging device, e.g., a LiDAR device. The system may further comprise one or more other devices or components. in various arrangements.

"Location" and "position" may be used synonymously to refer to a point in two or three-dimensional space that may be represented as having an x, y, and z coordinate. In certain contexts, a location or position can be temporal as opposed to physical.

"Scan" and "scanning" may refer to performing one or more measurements of an object or an environment from one or more locations using a light ranging device. A scan may be of a vehicle's exterior. A "vehicle exterior" or "the exterior of a vehicle" may refer to the outermost surface of the vehicle.

A "model" may be a digital representation of a physical object. For example, a model of a vehicle exterior may be a digital representation of the exterior of the vehicle, such as a three-dimensional or two-dimensional visual representation. The visual representation may take the form of a collection of points having positions in a two-dimensional or three-dimensional space, or a mesh having vertices at various positions in a two-dimensional or three-dimensional space. The representation may further be displayed and viewed by a user.

A "proximity" or a "proximity value" may refer to a type of risk value that relates to the potential for an environmental object to collide with the vehicle. It may be a function of various factors including the distance between the environmental object and the vehicle, the velocity of the environmental object relative to the vehicle, the direction in which the environmental object may be travelling relative to the vehicle, and any other factors that may be relevant to the risk of a potential collision between the vehicle and the environmental object.

A "risk value" may refer to a derived value that relates to a risk of potential harm to the vehicle or the driver of the vehicle. One example of a risk value may be a proximity value as described above, which relates to the potential for vehicle collisions with environmental objects. Other examples of risk values may include values that relate to the likelihood that the vehicle might tip over as a result of turning too quickly, that the driver might be distracted while driving the vehicle, or any other risks that may be determined based on data collected by the light ranging system as described in embodiments of the present technology. The risk value may be determined based on data, such as ranging data, collected by components of the light ranging system, such as one or more light ranging devices and any calibration devices. While embodiments may be described herein with respect to using proximity values, it is understood that other types of risk values may also be used to implement various alternative embodiments of the present technology.

A "coordinate frame" may refer to a three-dimensional coordinate system having an x, y, and z dimension that may be used to define data points in a model of the vehicle exterior and/or additional environmental structures around the vehicle, wherein the model of the vehicle exterior may be in the form of a mapping comprising a plurality of data points corresponding to points on the vehicle exterior and/or the surfaces of environmental structures.

A "virtual camera" may refer to a mathematical structure for constructing an image. A virtual camera may be established using mathematical calculations that determine how a scene will be rendered based on a position and orientation of the virtual camera. A position and orientation of a virtual camera may be determined based on the location of one or more ranging devices along with a desired pose of the virtual camera. The virtual camera can be placed such that an image reflects what a camera would see if it were actually at different poses in the environment. Similar to a real camera, a virtual camera can be repositioned and zoomed to change the field of view of the virtual camera.

DETAILED DESCRIPTION

A light ranging system can provide a data stream of ranging data, including distance vectors to environmental surfaces. The data stream can be provided from one or more sensors (e.g., clusters of single-photon avalanche diodes (SPADs)), which may move (e.g., rotate) or stay fixed. When a LiDAR device rotates, the data stream can serially provide distance vectors for different angular positions of the LiDAR device after the ranging data has been measured. For fixed devices, a data stream can include batches of distance vectors for a same sensor position, but at different times.

Various embodiments can use one or more light ranging systems. In some implementations, measurements of a light ranging system can be displayed to a driver while driving. Images from ranging measurements can indicate locations of objects in the environment, where various views of the environment can be provided by moving a pose of a virtual camera. Further, regions of a model of an exterior of a vehicle can be semantically labeled so that proximity events or changes between models taken at different times can indicate areas of the vehicle that have changed or need inspection.

In embodiments, the light ranging system may be completely independent from the vehicle's systems with the exception of receiving power from the vehicle. Rather than using data supplied by the vehicle, the light ranging system may perform its sensing, analytical, and other processing functions solely based on data collected by light ranging devices comprised within the light ranging system. Therefore, a light ranging system may not be connected to the vehicle controller area network (CAN) bus. This kind of independence may allow the light ranging system to be easily adapted to any vehicle using the calibration methods described in this application.

I. EXAMPLE LIGHT RANGING DEVICE

Figure 2:
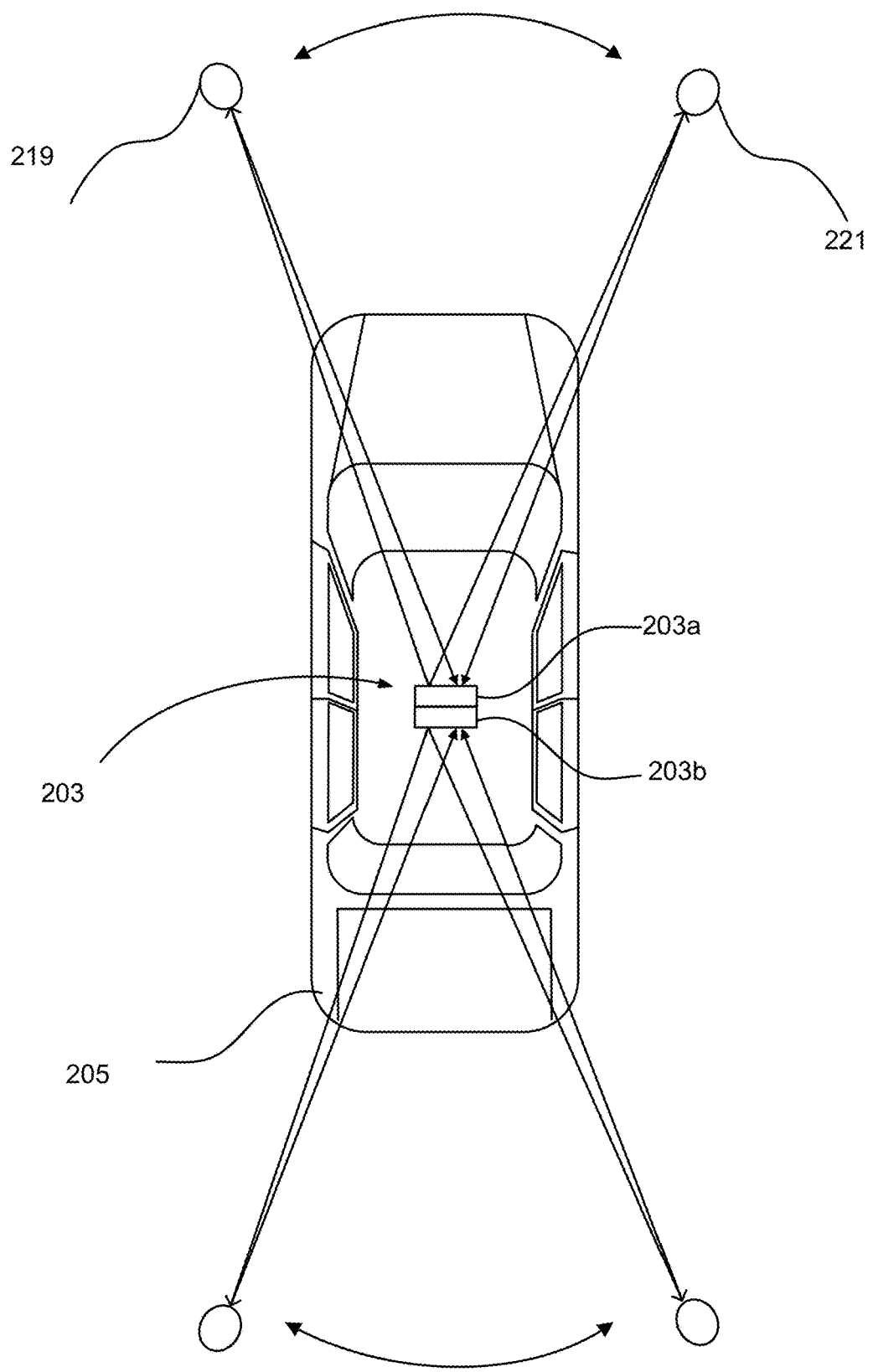
FIG. 2 shows an example of a light ranging system having a solid-state LiDAR device installed on top of a vehicle according to some embodiments.

FIGS. 1-2 show automotive light ranging devices, also referred to herein as LiDAR systems, according to some embodiments. The automotive application for the LiDAR systems is chosen here merely for the sake of illustration and the sensors described herein may be employed in any vehicle or fleet of vehicles, e.g., boats, aircraft, trains, etc., or in any application where 3D depth images are useful, e.g., in medical imaging, geodesy, geomatics, archaeology, geography, geology, geomorphology, seismology, forestry, atmospheric physics, laser guidance, airborne laser swath mapping (ALSM), and laser altimetry. According to some embodiments, a LiDAR system, e.g., scanning LiDAR system 101 and/or solid state LiDAR system 203, may be mounted on the roof of a vehicle 105 as shown in FIGS. 1 and 2.

The scanning LiDAR system 101 shown in FIG. 1 can employ a scanning architecture, where the orientation of the LiDAR light source 107 and/or detector circuitry 109 can be scanned around one or more fields of view 110 within an external field or scene that is external to the vehicle 105. In the case of the scanning architecture, the emitted light 111 can be scanned over the surrounding environment as shown. For example, the output beam(s) of one or more light sources (such as infrared or near-infrared pulsed IR lasers, not shown) located in the LiDAR system 101, can be scanned, e.g., rotated, to illuminate a scene around the vehicle.

In some embodiments, the scanning, represented by rotation arrow 115, can be implemented by mechanical means, e.g., by mounting the light emitters to a rotating column or platform. In some embodiments, the scanning can be implemented through other mechanical means such as through the use of galvanometers. Chip-based steering techniques can also be employed, e.g., by using microchips that employ one or more micro-electromechanical system (MEMS) based reflectors, e.g., such as a digital micromirror (DMD) device, a digital light processing (DLP) device, and the like. In some embodiments, the scanning can be effectuated through non-mechanical means, e.g., by using electronic signals to steer one or more optical phased arrays.

FIG. 2 shows an example of a light ranging system having a solid-state LiDAR device installed on top of a vehicle according to some embodiments. For a stationary architecture, like solid state LiDAR system 203 shown in FIG. 2, one or more flash LiDAR subsystems (e.g., 203a and 203b) can be mounted to a vehicle 205. Each solid state LiDAR unit can face a different direction (possibly with partially and/or non-overlapping fields of views between units) so as to capture a composite field of view that is larger than each unit is capable of capturing on its own.

In either the rotating or stationary architectures, objects within the scene can reflect portions of the light pulses that are emitted from the LiDAR light sources. One or more reflected portions then travel back to the LiDAR system and can be detected by the detector circuitry. For example, in FIG. 1, reflected portion 117 can be detected by detector circuitry 109. The detector circuitry can be disposed in the same housing as the emitters. Aspects of the scanning system and stationary system are not mutually exclusive and thus can be used in combination. For example, the individual LiDAR subsystems 203a and 203b in FIG. 2 can employ steerable emitters such as an optical phased array or the whole composite unit may rotate through mechanical means thereby scanning the entire scene in front of the LiDAR system, e.g., from field of view 219 to field of view 221.

Figure 3:
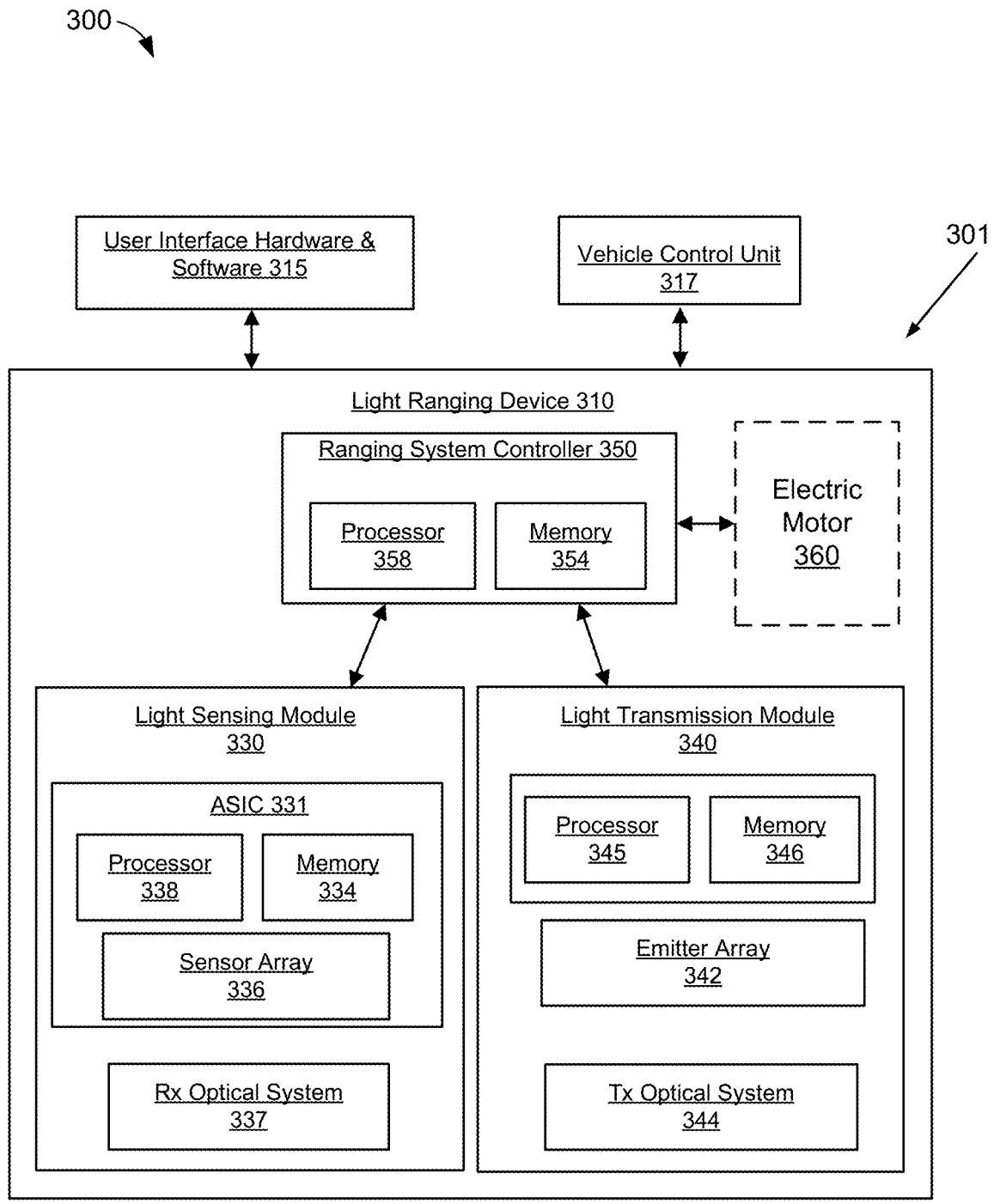
FIG. 3 shows a block diagram of an example of a LiDAR device for implementing various embodiments.

FIG. 3 illustrates a more detailed block diagram of a rotating LiDAR system 301 according to some embodiments. More specifically, FIG. 3 optionally illustrates a rotating LiDAR system that can employ a rotary actuator on a rotating circuit board, which receives power and transmits and receives data from a stationary circuit board.

LiDAR system 301 can interact with one or more instantiations of user interface hardware and software 315. The different instantiations of user interface hardware and software 315 can vary and may include, e.g., a computer system with a monitor, keyboard, mouse, CPU and memory; a touch-screen in an automobile; a handheld device with a touch-screen; or any other appropriate user interface. The user interface hardware and software 315 may be local to the object upon which the LiDAR system 301 is mounted but can also be a remotely operated system. For example, commands and data to/from the LiDAR system 301 can be routed through a cellular network (LTE, etc.), a personal area network (Bluetooth, Zigbee, etc.), a local area network (WiFi, IR, etc.), or a wide area network such as the Internet.

The user interface hardware and software 315 can present the LiDAR data from the device to the user but can also allow a user to control the LiDAR system 301 with one or more commands. Example commands can include commands that activate or deactivate the LiDAR system, specify photo-detector exposure level, bias, sampling duration and other operational parameters (e.g., emitted pulse patterns and signal processing), specify light emitters parameters such as brightness. In addition, commands can allow the user to select the method for displaying results. The user interface can display LiDAR system results which can include, e.g., a single frame snapshot image, a constantly updated video image, an accumulated image of data over time into a map, a simplified projected view of a three-dimensional environment around a vehicle, associated data overlaid on the LiDAR data like color or texture, and/or a display of other light measurements for some or all pixels such as ambient noise intensity, return signal intensity, calibrated target reflectivity, target classification (hard target, diffuse target, retroreflective target), range, signal to noise ratio, target radial velocity, return signal temporal pulse width, signal polarization, noise polarization, and the like. In some embodiments, user interface hardware and software 315 can track distances of objects from the vehicle, and potentially provide alerts to a driver or provide such tracking information for analytics of a driver's performance.

In some embodiments, the LiDAR system can communicate with a vehicle control unit 317 and one or more parameters associated with control of a vehicle can be modified based on the received LiDAR data. For example, in a fully autonomous vehicle, the LiDAR system can provide a real-time 3D image of the environment surrounding the car to aid in navigation. In other cases, the LiDAR system can be employed as part of an advanced driver-assistance system (ADAS) or as part of a safety system that, e.g., can provide 3D image data to any number of different systems, e.g., adaptive cruise control, automatic parking, driver drowsiness monitoring, blind spot monitoring, collision avoidance systems, etc. When a vehicle control unit 317 is communicatively coupled to light ranging device 310, alerts can be provided to a driver or a proximity of an object (e.g. a shortest distance between the object and the vehicle exterior) can be tracked, such as for evaluating a driver.

The LiDAR system 301 shown in FIG. 3 includes the light ranging device 310. The light ranging device 310 includes a ranging system controller 350, a light transmission (Tx) module 340 and a light sensing (Rx) module 330. Ranging data can be generated by the light ranging device by transmitting one or more light pulses from the light transmission module 340 to objects in a field of view surrounding the light ranging device. Reflected portions of the transmitted light are then detected by the light sensing module 330 after some delay time. Based on the delay time, the distance to the reflecting surface can be determined. Other ranging methods can be employed as well, e.g. continuous wave, Doppler, and the like.

The Tx module 340 includes an emitter array 342, which can be a one-dimensional or two-dimensional array of emitters, and a Tx optical system 344, which when taken together can form an array of micro-optic emitter channels. Emitter array 342 or the individual emitters are examples of laser sources. The Tx module 340 further includes optional processor 345 and memory 346, although in some embodiments these computing resources can be incorporated into the ranging system controller 350. In some embodiments, a pulse coding technique can be used, e.g., Barker codes and the like. In such cases, memory 346 can store pulse-codes that indicate when light should be transmitted. In one embodiment the pulse-codes are stored as a sequence of integers stored in memory.

The Rx module 330 can include sensor array 336, which can be, e.g., a one-dimensional or two-dimensional array of photosensors. Each photosensor (also just called a sensor) can include a collection of photon detectors, e.g., SPADs or the like, or a sensor can be a single photon detector (e.g., an APD). Like the Tx module 340, Rx module 330 includes an Rx optical system 337. The Rx optical system 337 and sensor array 336 taken together can form an array of micro-optic receiver channels. Each micro-optic receiver channel measures light that corresponds to an image pixel in a distinct field of view of the surrounding volume. Each sensor (e.g., a collection of SPADs) of sensor array 336 can correspond to a particular emitter of emitter array 342, e.g., as a result of a geometrical configuration of light sensing module 330 and light transmission module 340.

In one embodiment, the sensor array 336 of the Rx module 330 can be fabricated as part of a monolithic device on a single substrate (using, e.g., complementary metal-oxide-semiconductor (CMOS) technology) that includes both an array of photon detectors and an application-specific integrated circuit (ASIC) 331 for signal processing the raw signals from the individual photon detectors (or groups of detectors) in the array. As an example of signal processing, for each photon detector or grouping of photon detectors, memory 334 (e.g., SRAM) of the ASIC 331 can accumulate counts of detected photons over successive time bins, and these time bins taken together can be used to recreate a time series of the reflected light pulse (i.e., a count of photons vs. time). This time-series of aggregated photon counts is referred to herein as an intensity histogram (or just histogram). In addition, the ASIC 331 can accomplish certain signal processing techniques (e.g., by a processor 338), such as matched filtering, to help recover a photon time series that is less susceptible to pulse shape distortion that can occur due to SPAD saturation and quenching. In some embodiments, one or more components of the ranging system controller 350 can also be integrated into the ASIC 331, thereby eliminating the need for a separate ranging controller module.

In some embodiments, one or more of the individual components of the Rx optical system 337 can also be part of the same monolithic structure as the ASIC, with separate substrate layers for each receiver channel layer. For example, an aperture layer, collimating lens layer, an optical filter layer and a photo-detector layer can be stacked and bonded at the wafer level before dicing. The aperture layer can be formed by laying a non-transparent substrate on top of a transparent substrate or by coating a transparent substrate with an opaque film. In yet other embodiments, one or more components of the Rx module 330 may be external to the monolithic structure. For example, the aperture layer may be implemented as a separate metal sheet with pin-holes.

In some embodiments, the photon time series output from the ASIC is sent to the ranging system controller 350 for further processing, e.g., the data can be encoded by one or more encoders of the ranging system controller 350 and then sent as data packets via the optical downlink. Ranging system controller 350 can be realized in multiple ways including, e.g., by using a programmable logic device such an FPGA, as an ASIC or part of an ASIC, using a processor 358 with memory 354, and some combination of the above. The ranging system controller 350 can cooperate with a stationary base controller or operate independently of the base controller (via pre-programed instructions) to control the light sensing module 330 by sending commands that include start and stop light detection and adjust photo-detector parameters.

Similarly, the ranging system controller 350 can control the light transmission module 340 by sending commands, or relaying commands from the base controller, that include start and stop light emission controls and controls that can adjust other light-emitter parameters such as emitter temperature control (for wavelength tuning), emitter drive power and/or voltage. If the emitter array has multiple independent drive circuits, then there can be multiple on/off signals that can be properly sequenced by the ranging system controller. Likewise, if the emitter array includes multiple temperature control circuits to tune different emitters in the array differently, the transmitter parameters can include multiple temperature control signals. In some embodiments, the ranging system controller 350 has one or more wired interfaces or connectors for exchanging data with the light sensing module 330 and with the light transmission module 340. In other embodiments, the ranging system controller 350 communicates with the light sensing module 330 and light transmission module 340 over a wireless interconnect such as an optical communication link.

The electric motor 360 is an optional component needed when system components, e.g., the Tx module 340 and or Rx module 330, need to rotate. The system controller 350 controls the electric motor 360 and can start rotation, stop rotation and vary the rotation speed.

II. INSTALLATION AND OPERATION OF LIGHT RANGING SYSTEM

One or more light ranging devices, such as the example light ranging devices described above with respect to FIGS. 1-3, may form a light ranging system that may perform machine vision functions to assist with the operations of a vehicle. The light ranging system may further comprise other types of components such as interfaces for interacting with a user, computer systems for processing data, other types of sensing devices for collecting data, communication channels for transferring data between system components, and other components that may support the functionality of the light ranging system.

Figure 4A:
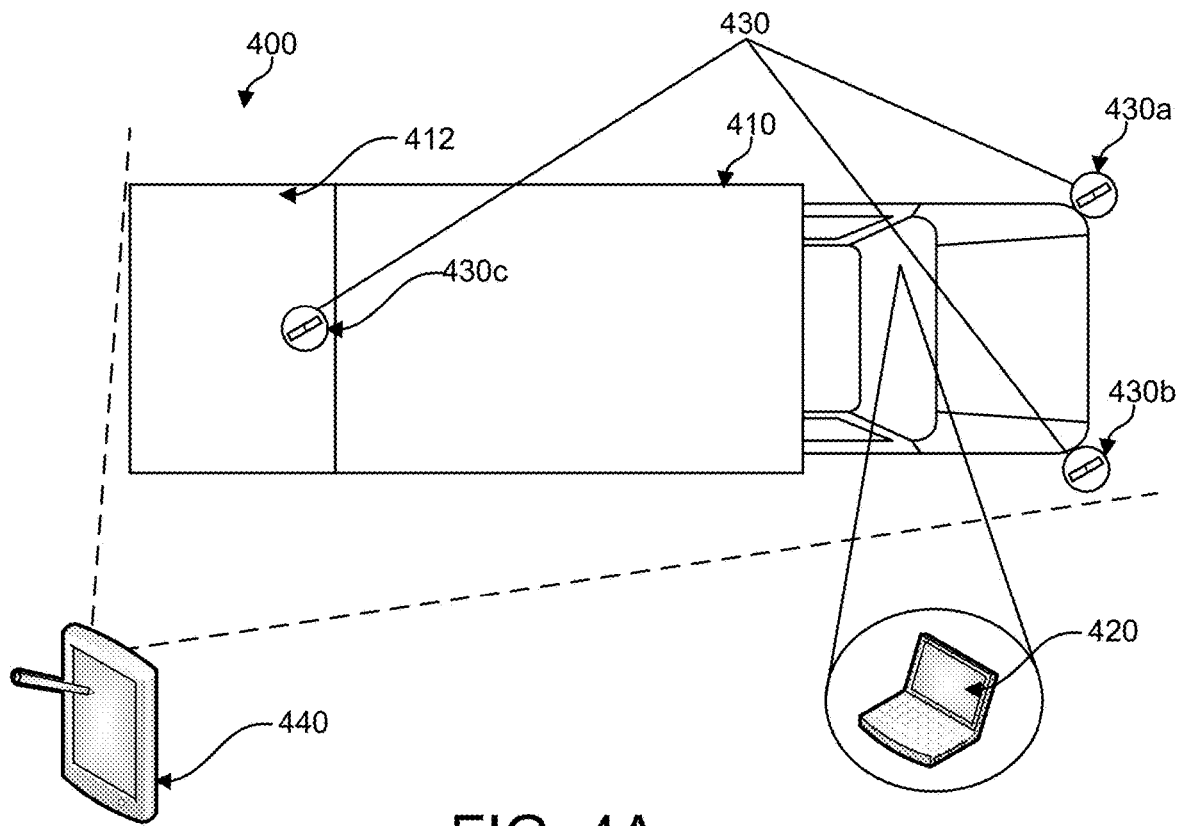
FIGS. 4A and 4B show an example of a light ranging system having three light ranging devices installed on a vehicle according to some embodiments.
Figure 4B:
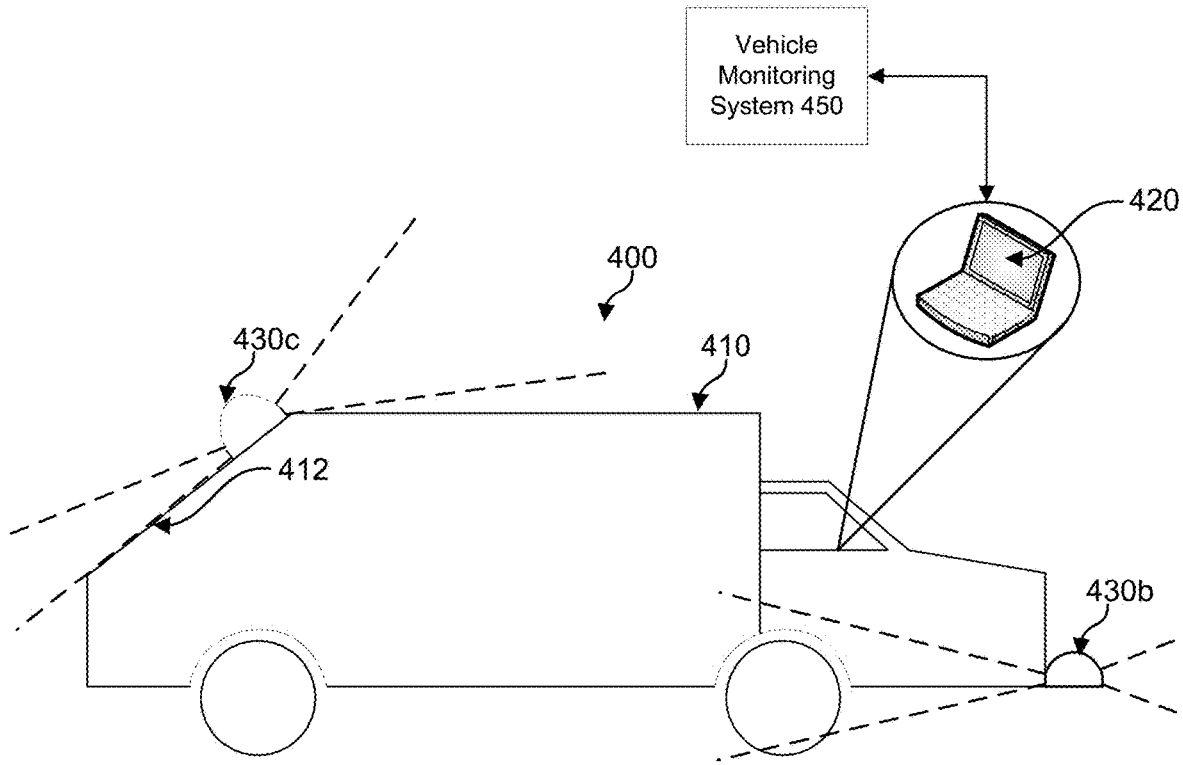

FIG. 4A illustrates an example of a light ranging system 400 that provides ranging functionality and can assist with the operation of a vehicle 410, such as a waste truck as depicted in FIGS. 4A and 4B, according to embodiments of the present technology. The light ranging system 400 may comprise three light ranging devices 430 that may be installed on the vehicle 410 and a control unit 420 that may process the data collected by the three light ranging devices 430. The location of light ranging devices 430 are for illustrative purposes only and that in some instances the devices can be mounted in a recess or similar cavity of the vehicle so that appear flush or near flush with one or more exterior surfaces of the car, thereby providing an attractive aesthetic appearance.

A. Light Ranging Devices

The three light ranging devices 430a-430c may be LiDAR devices, such as the devices previously described with respect to FIGS. 1 and 2. It is understood that any number of light ranging devices 430 may be installed on the vehicle 410 and that the light ranging devices 430 may be arranged in a variety of configurations on the vehicle 410 in alternative embodiments. For example, a light ranging system 400 may comprise only one light ranging device 430 placed on top of a vehicle 410 as depicted in FIG. 1. In a light ranging system 400 having multiple light ranging devices 430, the light ranging devices 430 may be placed around the vehicle 410 as to maximize the amount of the environment surrounding the vehicle the light ranging devices may collectively sense. In other words, the light ranging devices 430 may be placed around the vehicle 410 as to maximize a coverage area of the light ranging system 400.

In one embodiment, a first light ranging device 430a may be installed at waist level at a front-left corner of the vehicle 410 with respect to a top-down view of the vehicle 410 as shown in FIG. 4A. Similarly, a second light ranging device 430b may be installed at waist level at a front-right corner of the vehicle 410 as shown in FIGS. 4A and 4B. A third light ranging device 430c may be installed on top and towards the back of the vehicle 410 as shown in FIGS. 4A and 4B. Using this arrangement, the light ranging devices 430 are able to provide good coverage over the environment surrounding the vehicle 410 with minimal blind spots.

Generally, the first light ranging device 430a may primarily sense parts of the environment to the front and left sides of the vehicle 410; the second light ranging device 430b may primarily sense parts of the environment to the front and right sides of the vehicle 410; and the third light ranging device 430c may primarily sense parts of the environment above and behind the vehicle 410. However, there may be substantial overlap between the coverage areas of the three light ranging devices 430. Furthermore, there may be regions of the environment that cannot be sensed by any of the light ranging devices 430, such regions under the vehicle 410 or immediately behind the vehicle 410 since the body of the vehicle 410 may block the field of view or line of sight of one or more light ranging devices 430.

FIG. 4B illustrates a side view of the vehicle 410 and the light ranging system 400 from FIG. 4A. As seen in FIG. 4B, the first light ranging device 430a and the second light ranging device 430b are positioned at the front of the truck at about waist level as depicted in FIG. 4B, although a view of the first light ranging device 430a is blocked by the second light ranging device 430b. The light ranging devices 430a-430c may comprise one or more laser emitters and sensors that are able to spin around a vertical axis. In this way, the light ranging devices 430a and 430b, given their positions on the vehicle 410, may be able to scan the sides of the vehicle 410, the front of the vehicle 410, a 270 degree view of the surrounding environment, and anything else that's unobstructed and within the light ranging devices' 430 field of view, as represented by the dashed lines in FIG. 4B.

Similarly, the third light ranging device 430c may be positioned at the top-back portion of the vehicle 410 as shown in FIG. 4B. Given its positioning and orientation at an angle, it is able to see both the back and the top of the vehicle 410 as represented in FIG. 4B by the dashed lines. Given this set up of the light ranging devices 430, blind spots may include the regions directly behind the base of the vehicle 410 and directly under the vehicle 410 as previously discussed.

B. Control Unit

The light ranging devices 430a-430c may survey (i.e., performing ranging measurements) the environment to collect ranging data and transfer the ranging data to a control unit 420. The ranging data may then be processed and analyzed by the control unit 420. The transfer of the ranging data may be conducted via a communication channel, which may be a wired communication channel comprising a cable that connects the light ranging devices 430 to the control unit 420. Alternatively, the control unit 420 may also be a wireless communication channel such as Bluetooth or Wi-Fi. It is understood that the ranging data may also be processed and analyzed on the light ranging device 430 without having to transfer the ranging data to a separate control unit 420 or device in alternative embodiments. The ranging data or processed information (e.g., information about a breach or other event) can be transmitted wireless to a vehicle monitoring system 450, e.g., using any suitable radio technology. In some implementations, vehicle monitoring system 450 can communicate with various light ranging systems on other vehicles.

The control unit 420 may be a waterproof computer that may be installed in the driver's cabin, such as on the dashboard. The control unit 420 may comprise a computer system having a processor and memory for performing various computational functions, a communicator for interfacing and communicating with other devices within or external to the light ranging system 400, and interface elements such as a graphical display, speakers, and a camera for interacting with a driver of the vehicle 410 or any other users of the light ranging system 400.

In one embodiment, the control unit may be a laptop that is attached to the driver's dashboard. Alternatively, the control unit may also be hardware that is built into the dashboard of the car in alternative embodiments. In yet another embodiment, the core processing components of the control unit 420 may be in a separate device from the interface elements. For example, the core processing components may be in a device that is mounted on top of the vehicle leaving only the interface elements on the driver's dashboard. It is understood that other configurations of the control unit 420 and its components may be possible in alternative embodiments.

The camera of the control unit 420 may be used to record a video of the driver while the vehicle is in operation. The camera may further collect visual data that may be used to track the driver's gaze and generate a log of eye-tracking data. The control unit may use the eye-tracking data or measure head orientation to detect when a driver is distracted and provide an alert to the driver in such events. The eye tracking and/or head orientation data may further be used by a manager to supervise drivers' performance.

C. Calibration Device

The light ranging system 400 may further comprise a calibration imaging device 440 that may be used to calibrate the light ranging system 400 by performing a full body (360-degree) scan of the vehicle 410 to generate a digital model of the vehicle 410 exterior. For example, a user may walk around vehicle 410 to obtain a relatively complete scan of the vehicle's exterior. The model may be used to assist with proximity detection.

The calibration imaging device 440 may be a light ranging device and may be the same type of light ranging device, such as a LiDAR device, as the three light ranging devices 430a-430c installed on the vehicle 410. It is understood that the calibration imaging device 440 may also be any device that is capable of performing a scan of the vehicle 410 to produce imaging data (e.g., ranging data) that may be used to construct a digital model of the vehicle exterior.

The calibration imaging device 440 may further comprise a computing system having a processor, a memory, a touch screen for interacting with a driver or user, and a communicator, such as a Bluetooth or Wi-Fi transceiver, for communicating with the control unit 420. For example, the calibration imaging device 440 may be a tablet device having the above mentioned components as well as a built-in LiDAR sensor. As another example, the calibration imaging device may include a LiDAR system installed at a gate through which the vehicle 410 leaves and enters. In one embodiment, the processor and memory of the calibration imaging device 440 may process the imaging data collected by the built-in LiDAR sensor and generate the model of the vehicle 410 exterior. The communicator of the calibration imaging device 440 may then send the model of the vehicle 410 exterior to the control unit 420 for use in proximity detection.

In an alternative embodiment, the communicator may send the collected imaging data to the control unit 420 wherein the imaging data is used by the control unit 420 to generate the model of the vehicle 410 exterior. In yet another alternative embodiment, the communicator may send the collected imaging data to a remote server wherein the imaging data is used by the server to generate the model of the vehicle 410 exterior wherein the model may then be transmitted back to the control unit 420.

III. CALIBRATING A LIDAR SENSOR SYSTEM

The light ranging system 400 described with respect to FIGS. 4A-4B may be calibrated by scanning the vehicle 410 and the light ranging devices 430 installed in the vehicle 410 with a calibration imaging device 440. The scan may produce imaging data that may be processed and used to construct a model of the vehicle 410 exterior. The model may then be subsequently used to detect when something in the environment may be getting too close to the vehicle 410 exterior.

A. Scan Vehicle

A driver or any other personnel may use the calibration imaging device 440 to scan the vehicle 410, according to embodiments of the present technology. Alternatively, or additionally, the vehicle 410 may be scanned using a static calibration imaging device (e.g., attached at a gate or building entrance). In some embodiments, the calibration imaging device 440 and the light ranging devices 430 mounted on the vehicle 410 may also collect information about the environment to assist with the calibration process using environmental cues and reference points. The scanning process may be three-dimensional in nature and the data collected through the scanning processing may be used to construct a three-dimensional model of the vehicle. The scanning process may also generate data that is used to construct a two-dimensional model of the vehicle in alternative embodiments.

A user may use the calibration imaging device 440 to scan the vehicle 410, e.g., through the use of a LiDAR device built into the calibration imaging device 440 as previously discussed. The user may further orient the calibration imaging device 440 at the vehicle to perform a plurality of measurements of the vehicle 410 exterior while walking all the way around the vehicle so that a full body (360-degree) scan of the vehicle may be performed. The user may further raise the calibration imaging device 440 to a level above or lower the calibration imaging device 440 to a level below the vehicle 410 to scan the top and bottom exterior surfaces of the vehicle. By scanning the vehicle 410 using the calibration imaging device 440, the calibration imaging device 440 may generate imaging data that may be used to construct a model of the vehicle 410. The calibration imaging device 440 may be installed in or on a cart that has wheels, thereby allowing easy movement around the vehicle.

In one embodiment, as the user moves around the vehicle with the calibration imaging device 440, the calibration imaging device 440 may determine its own trajectory, and/or position while simultaneously collecting data and building a three-dimensional model of the environment comprising the vehicle 410 exterior. The vehicle model can be obtained by discarding points outside of a loop formed from the calibration device's trajectory, as well as the ground plane.

Accordingly, the calibration imaging device 440 may collect a sequence of imaging data that is collected over time and along a trajectory in three-dimensional space. The calibration imaging device 440 may further receive a stream of data from the light ranging devices 430 mounted on the vehicle 410 in a similar format of a continuous sequence of data collected over time and along a trajectory in three-dimensional space. The calibration imaging device 440 may then determine a best fit between the of data received from the light ranging devices 430 and the calibration imaging device's 440 own data sequence that it has collected through the scanning process. The best fit may be determined using an iterative closest point algorithm or a variation of the algorithm as known in the art.

By determining the best fit across data from the calibration imaging device 440 and the light ranging devices 430, the calibration imaging device 440 may combine all of that data into one spatial coordinate system and construct a model within this coordinate system that would comprise representations of the vehicle envelope as well as any environmental structures that the calibration imaging device 440 and the light ranging devices 430 may have scanned and collected data about as well. Incorporating data about additional structures in the environment may help improve the calibration process by using these additional structures as points of reference in the environment to combine multiple sensory data streams. This may result in a calibrated model of the vehicle exterior that is a more accurate representation of the vehicle exterior. These processes of converting a time series of imaging data into a three-dimensional map of points may be performed using a simultaneous localization and mapping (SLAM) algorithm as known in the art. In alternative embodiments, these processes may also be performed remotely on a server to reduce computation time or improve accuracy.

Upon scanning the vehicle 410 and the surrounding environment and constructing a model to represent the vehicle 410 and the surrounding environment, the model may be segmented into various components. This may be done using the calibration imaging device 440, the remote server, a combination of both, or either device with aid from an operator. In one embodiment, where the model comprises the vehicle 410 exterior and a ground plane that the vehicle 410 is on top of, this segmentation process may be performed automatically by incorporating knowledge of gravity vectors into the model to identify the ground plane.

Based on the identified ground plane, the three-dimensional points in the model that exist above the ground plane may be segmented as being the vehicle envelope. Additional accuracy may be achieved by providing the system with a guess about the approximate size, shape, and location of the vehicle envelope in the accumulated map either through operator input or through a preloaded three-dimensional model of the vehicle envelope acquired from the vehicle manufacturer, from a scan of a previous, but similar vehicle, or from some other source. As previously mentioned, the model may also comprise environmental structures surrounding the vehicle 410. Once the ground plane and the vehicle 410 are segmented, what remains in the model may be segmented as being part of the environment, and may be used later in the calibration process. Overall, this process may allow the vehicle exterior segment to be isolated from other elements that may be incorporated into the model as part of the scanning process.

In another embodiment, the calibration imaging device 440 may generate a set of imaging data each time it performs a measurement of the vehicle 410 exterior at a particular location. Accordingly, each set of imaging data may comprise a location of the calibration imaging device 440, a plurality of points on surfaces scanned by the calibration imaging device 440, a distance measure between the calibration imaging device 440 and each point, and an angular direction for each point relative to the calibration imaging device 440.

In one embodiment, when the calibration imaging device 440 begins the scanning process, it may set its current location as an origin position and initialize an x, y, and z axis to function as references for subsequent position measurements. Accordingly, the current location of the calibration imaging device 440, being at the origin position, may be presented as having x, y, and z coordinates of 0,0,0, corresponding to the calibration imaging device's 440 position in three-dimensional space relative to the origin position. The calibration imaging device 440 may then begin to scan the vehicle 410 by performing a series of measurements of the vehicle 410 surface as the calibration imaging device 440 is moved around the vehicle 410 so that measurements at different angles may be performed. As the calibration imaging device 440 is moved, the calibration imaging device 440 may track its change in position relative to its starting position (origin position). Thus, for each additional set of measurements at a new position, the calibration imaging device 440 may compute a new set of x, y, and z coordinates for the new position to correspond to a set of imaging data produced by the measurements of the vehicle 410 exterior at the new position. It is understood that the calibration imaging device 440 may also measure its location independently from an origin position, such as by using a GPS device or inertial measurement unit (IMU), in alternative embodiments.

During each measurement of the vehicle exterior, the calibration imaging device 440 may further measure a distance vector between points on a surface of the vehicle 410 exterior and the calibration imaging device 440. A distance vector may be measured for each point that is within the calibration imaging device's field of view and therefore detectable by the calibration imaging device 440. The distance vector may include both how far the point is from the calibration imaging device 440 and also the angular direction of that point relative to the calibration imaging device 440.

Accordingly, a measurement of the vehicle 410 exterior may generate imaging data comprising a model position (ideally corresponding to the physical position) of the calibration imaging device 440 as well as one or more distance vectors corresponding to each point on vehicle 410 exterior that has been detected by the calibration imaging device 440. This imaging data may be stored in an array or any other suitable data structure. A complete scan of the vehicle 410 involving multiple measurements of the vehicle 410 exterior from different sensor positions may thus generate multiple sets of imaging data corresponding to different measurements, wherein each set of imaging data comprises a position of the calibration imaging device 440 and multiple distance vectors.

B. Construct Vehicle Model

The previously generated imaging data may be processed and used to construct a three-dimensional model of the vehicle, herein referred to as the primary model, according to an embodiment. Once the vehicle and the surrounding area has been scanned and accumulated into a map, the calibration imaging device 440, the remote server, a combination of both, or either device with aid from an operator may segment the map into the vehicle envelop, or primary model, and the surrounding environment. This step may be performed automatically by using knowledge of the earth's gravity vector in the map coordinate frame to identify the ground plane, and based on the ground plane, extract all of the three-dimensional points from the imagery that exist above the ground plane in the z direction, e.g., lying within a loop trajectory taken by the calibration imaging device 440. These points in aggregate are assumed to be the vehicle envelope. Additional accuracy may be achieved by providing the system with a guess about the approximate size, shape, and location of the vehicle envelope in the accumulated map either through operator input or through a pre-loaded three-dimensional model of the vehicle, or from some other source.

The primary model may have a coordinate system and an origin or origin position having x, y, and z coordinates of 0,0,0. It is understood that the primary model may be combined with other models, such as partial, secondary, and additional models of the vehicle or environment, such that all the models are merged into the coordinate system of the primary model so that all the models effectively share the same origin position. Thus, each of the separate models can have their own origin within that particular model, but a translation vector between the coordinate systems effectively makes them have a same origin.

It is further understood that other approaches to modelling the vehicle 410 may also be possible in alternative embodiments. For example, a two-dimensional model of a top-down view of the vehicle 410 may be constructed to represent the outermost lateral boundaries of the vehicle 410. Accordingly, this two-dimensional model may be used to detect a proximity breach such as whenever an environmental object gets too close to the outer boundaries of the model. In addition, the two-dimensional model may further comprise a height measurement of the vehicle 410 to assist with detecting a proximity breach such as whenever an environmental object above the vehicle 410 gets too low as to potentially collide with the vehicle 410.

In one embodiment, constructing the vehicle model may be performed by a processor in the calibration imaging device 440 and thereafter transferred to the control unit 420 via a communication channel. The communication channel may wireless, such as Bluetooth or Wi-Fi. Alternatively, in another embodiment, the communication channel may be through a wired connection. In another embodiment, the imaging data may also be transferred from the calibration imaging device via a wireless or wired communication channel and thereafter processed by the control unit 420 to construct the primary model.

In one embodiment, the imaging data may be sent from the calibration imaging device 440 to the control unit 420, which then uses the imaging data to construct the primary model of the vehicle 410. For example, the control unit 420 may calculate a position for each point on the vehicle 410 exterior that was previously measured by the calibration imaging device 440. The position for each point may be calculated based on the position of the calibration imaging device 440, and the distance vector measured for that point. This calculation may be performed using vector operations. For example, a first distance vector may be between an origin position and a position of the calibration imaging device 440 where a particular measurement of the vehicle 410 exterior was made. The first distance vector may then be added to a previously measured second distance vector between the measured point and the calibration imaging device 440 to compute a third distance vector between the point and the origin position, thereby generating a set of positions.

Accordingly, the control unit 420 is able to generate a data set comprising the coordinates of each point captured in the set of imaging data. Based on this data set of coordinates, the control unit 420 may then construct a three-dimensional model to represent the outer surface of the vehicle 410 by connecting the points together. Each scan and each corresponding set of imaging data can capture a large number of points in order to ensure that the resolution of the primary model is sufficiently high as to be a precise representation of the vehicle 410 exterior.

In one embodiment, the primary model of the vehicle 410 may be constructed by the calibration imaging device 440 in real time while the user is using the calibration imaging device 440 to scan the vehicle 410. The primary model may further be displayed on a screen of the calibration imaging device 440 in real time to provide feedback to the user during the scanning process. Based on the display of the constructed primary model, the user may be able to see which parts of the vehicle 410 he has already scanned and which parts has yet to be scanned. In addition, the user may also be able to see whether a portion of the scan has a low resolution or was scanned improperly and may then respond by scanning that corresponding portion of the vehicle 410 again.

In the course of determining the primary model of the vehicle, the calibration imaging device 440 may also capture imaging data of the environment surrounding the vehicle, which is also accumulated in the map. Once the primary model is extracted/segmented, the remaining data may be considered as being the environment and may be saved on the calibration imaging device 440, on the control unit 420, or on an external server to be used to determine sensor positions.

C. Estimate Sensor Positions

In some embodiments, an estimate of the model positions of each light ranging device 430 may be determined. In one embodiment, default positions may be used as the estimated positions or an initial guess for where the light ranging devices 430 may be. The initial guess may then be subsequently refined to determine the actual positions (i.e., physical positions) of the light ranging devices 430. In one embodiment, the estimated positions may be determined based on user input. For example, the calibration imaging device 440 may comprise a touchscreen that displays a constructed model of the vehicle 410 to the user, who may then indicate on the touchscreen the approximate positions for where the light ranging devices 430 are positioned on the vehicle 410. The estimate can ensure that the model positions are corresponding to the physical positions of the light ranging devices.

In another embodiment, the estimated positions may be automatically determined by a processor, either on the calibration imaging device 440 or the control unit 420 or an external server. For example, a control unit 420 may know the housing dimensions of the light ranging device 430 and determine where the housing dimensions of the light ranging device 430 matches (aligns) with what appears to be a light ranging device 430 on the primary model. The one or more housing dimensions can include any combination of length, width, and height, as well as shape. Upon finding one or more successful matches on the primary model with the preconfigured model of the light ranging device 430, the positions for where the match took place may be set as the estimated positions for the one or more light ranging devices 430.

Accordingly, such extrinsic calibration of each light ranging device can be obtained by aligning its output with the primary model and/or with the environment. Since this alignment process can use an initial guess in order to converge, embodiments can use a method similar to random sample consensus. For example, random orientations and positions (up to 100,000 times) can be selected until a large majority of points are well-aligned. Points similar to those that are well-aligned (e.g., minor offsets with the random number) can be selected so as to refine the search near the well-aligned points, thereby focusing the search.

IV. DYNAMIC DISPLAY OF LIDAR IMAGES

In some embodiments, distance vectors, for different angular positions of the LiDAR device after the ranging data has been measured, can be used to generate a three-dimensional image stream. For example, the distance vectors can be used to compute pixels in an image. Pixels that have a similar distance (depth) can be displayed with a similar color. And, locations in the image where no object is detected (or at least not within a threshold distance) can remain a background color (e.g., black or white). In yet other embodiments, an intensity of a detected signal (e.g., number of photons detected) can be used to determine a color (e.g., a shade) and/or a brightness of a pixel. The images can be displayed on a display that is installed such that a driver can see the images, e.g., on a mounted tablet or a heads-up display (HUD).

Figure 5:
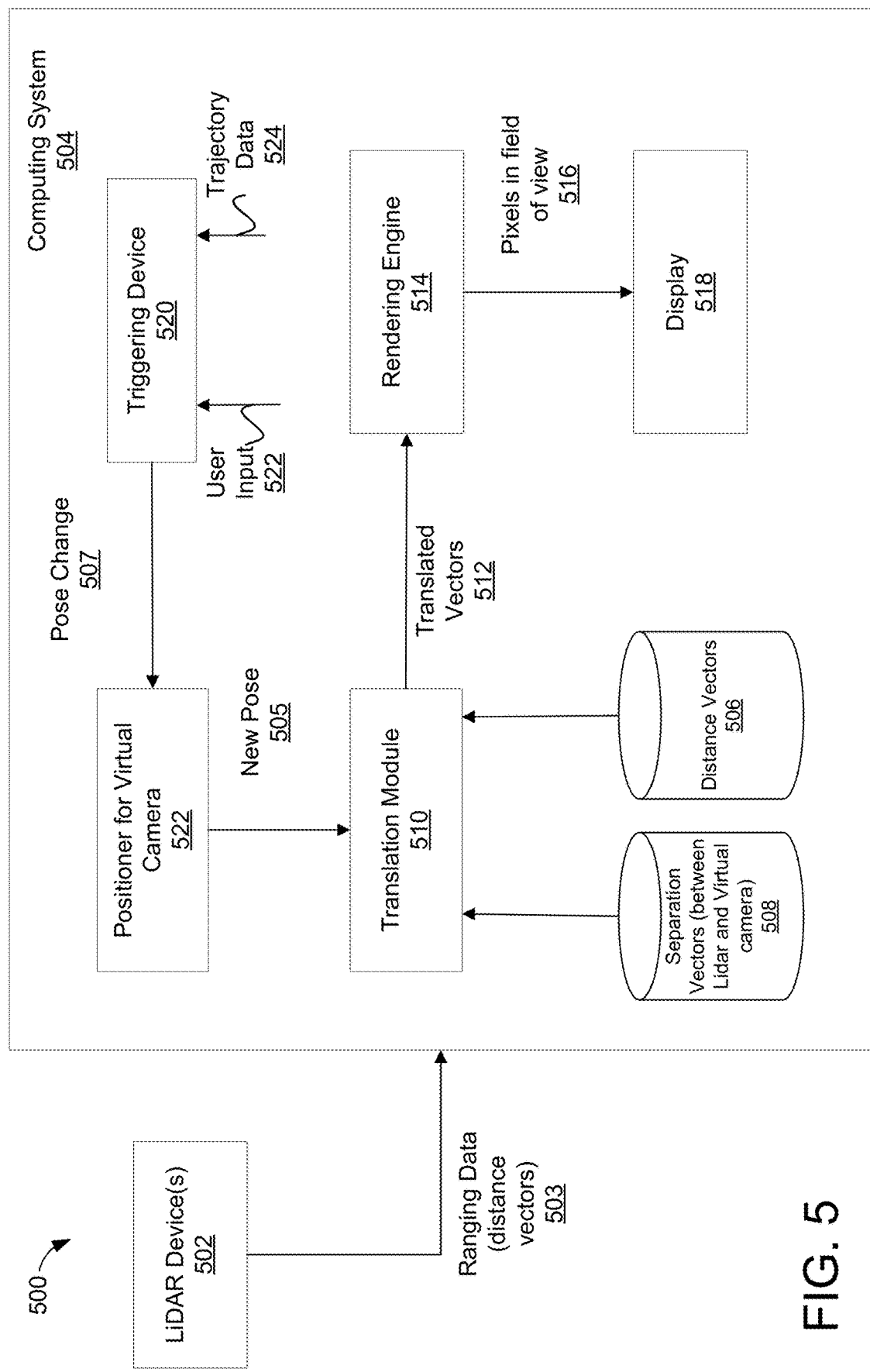
FIG. 5 shows LiDAR device(s) and a computing system for providing a dynamic display of LiDAR images according to embodiments of the present disclosure.

FIG. 5 shows a system 500 including LiDAR device(s) 502 and a computing system 504 for providing a dynamic display of LiDAR images according to some embodiments. Three LiDAR devices may be used, e.g., as shown in FIGS. 4A and 4B. The computing system 504 can correspond to control unit 420, as described above with respect to FIGS. 4A and 4B. The computing system 504 can include memory for storing a current batch of distance vectors 506. In various embodiments, the LiDAR device(s) 502 can provide three-dimensional points clouds of depth values or depth images with a specified resolution. Images may be provided that are similar to those generated with a camera, but enriched with depth values.

A 3D representation of the environment can be obtained using multiple pixels, each pixel corresponding to one or more detectors configured to detect incident light. For example, a pixel can output a count of incident photons, a time between incident photons, a time of incident photons (e.g., relative to an illumination output time), or other relevant data, and the system can transform these data into distances from the system to external surfaces in the fields of view of these pixels. By merging these distances with the position of pixels at which these data originated and relative positions of these pixels at a time that these data were collected, the system (or other device accessing these data) can reconstruct a three-dimensional (virtual or mathematical) model of a space occupied by the system, such as in the form of 3D image represented by a rectangular matrix of range values, wherein each range value in the matrix corresponds to a polar coordinate in 3D space. Techniques for generating a 3D representation of an environment are described in further detail in PCT Patent Publication WO 2018/039432, which is incorporated by reference in its entirety for all purposes.

The system of FIG. 5 can provide three-dimensional images using a virtual camera that can be placed at different poses. A virtual camera pose can include 3D Cartesian coordinates ("position") in combination with orientation (e.g., angular position). The virtual camera can be placed such that an image reflects what such a virtual camera would see if it were actually at different poses in the environment.

One or more LiDAR devices 502 may generate ranging data 503, as described above in sections I and II. The ranging data 503 may include distance vectors 506 between the one or more light ranging devices and a plurality of environmental surfaces. Accordingly, the distance vectors 506 can define locations of objects in the environment. The LiDAR devices 502 may transmit the ranging data 503 to a computing system 504. The computing system 504 may include a storage device for storing the distance vectors 506.

The computing system 504 may further include a positioner 522. The positioner 522 can determine a current pose of the virtual camera. Initially, the pose of the virtual camera may, for example, be selected from a set of pre-defined poses, e.g., of 4-8 virtual camera poses that provide fields of view that may be relevant to a driver. The pose of the virtual camera may start in one of the pre-defined poses (e.g., a default pose, or a pose deemed appropriate based on the position of the system with respect to the environment). The positioner 522 may, responsive to pose change information 507 received from a triggering device 520.

The triggering device 520 can determine when the virtual camera pose should change. The triggering device 520 may be configured to receive an indication of a change in the virtual camera. The triggering device 520 may include, or be communicatively coupled to, one or more of a trajectory processor, a proximity processor, and/or a user interface.

Figure 9:
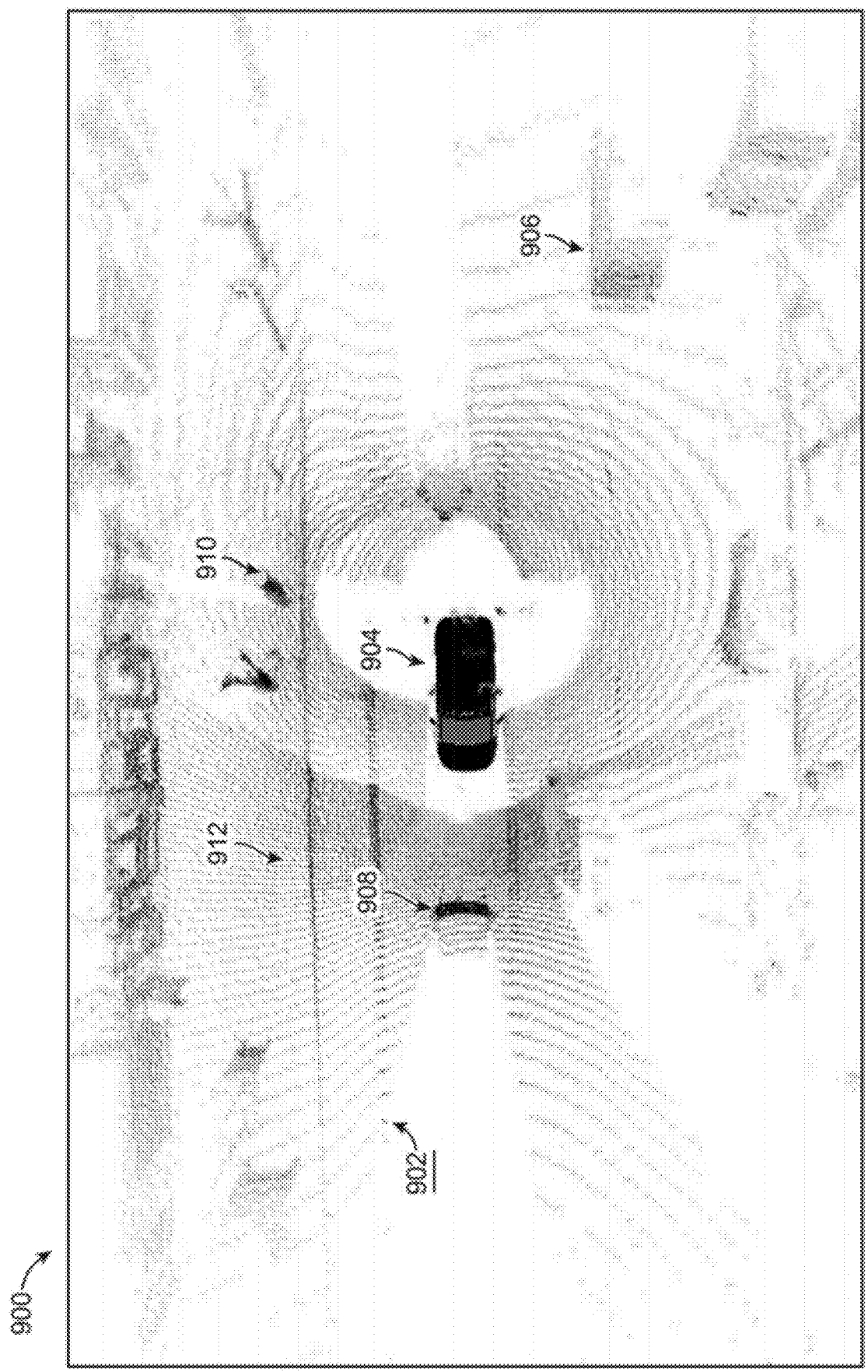
FIG. 9 illustrates an example of a display of a top-down view showing a vehicle model and point cloud, according to some embodiments.
Figure 10:
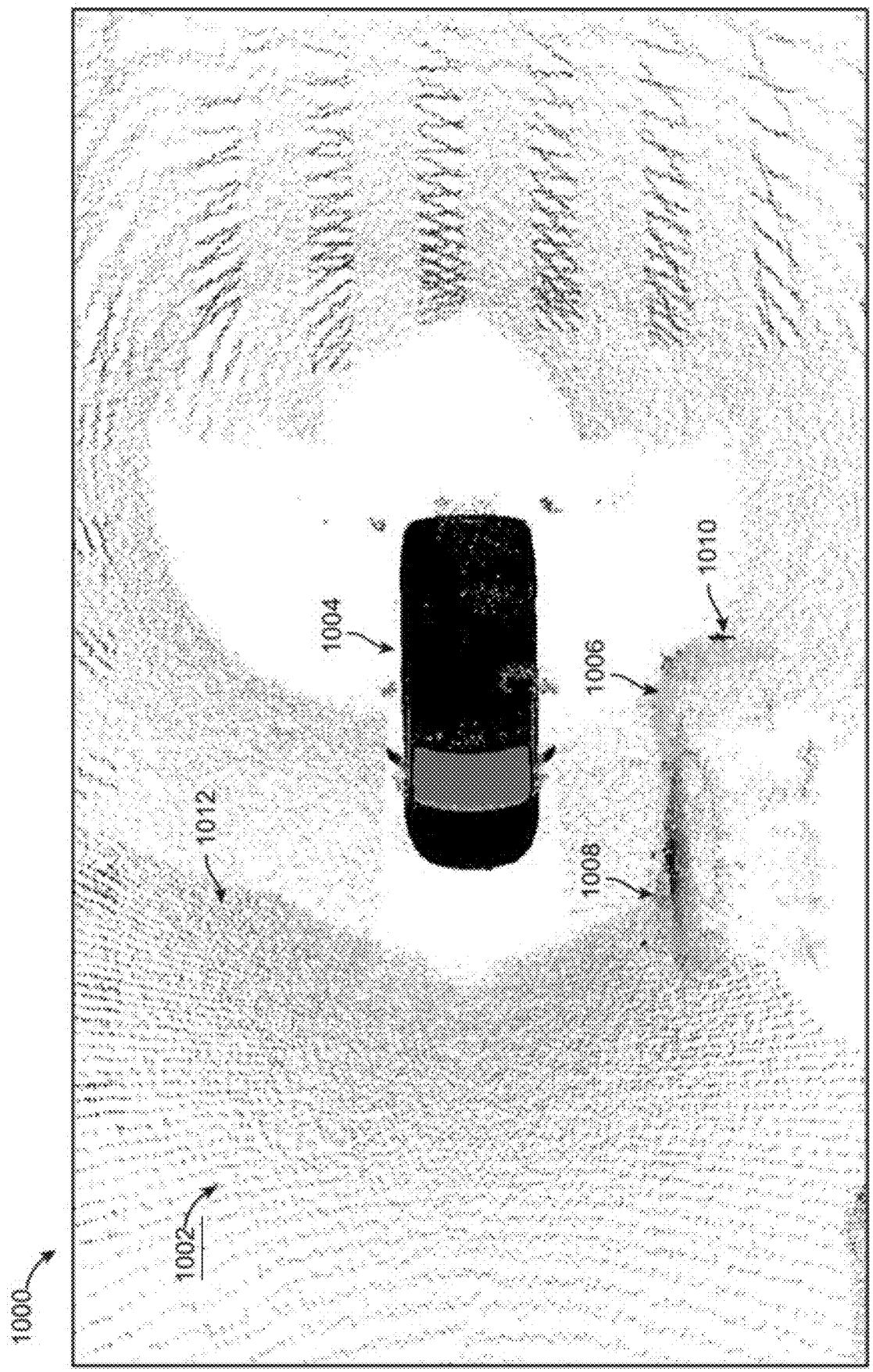
FIG. 10 illustrates an example of a display showing a zoomed top-down view of a vehicle model and point cloud, according to some embodiments.
Figure 11:
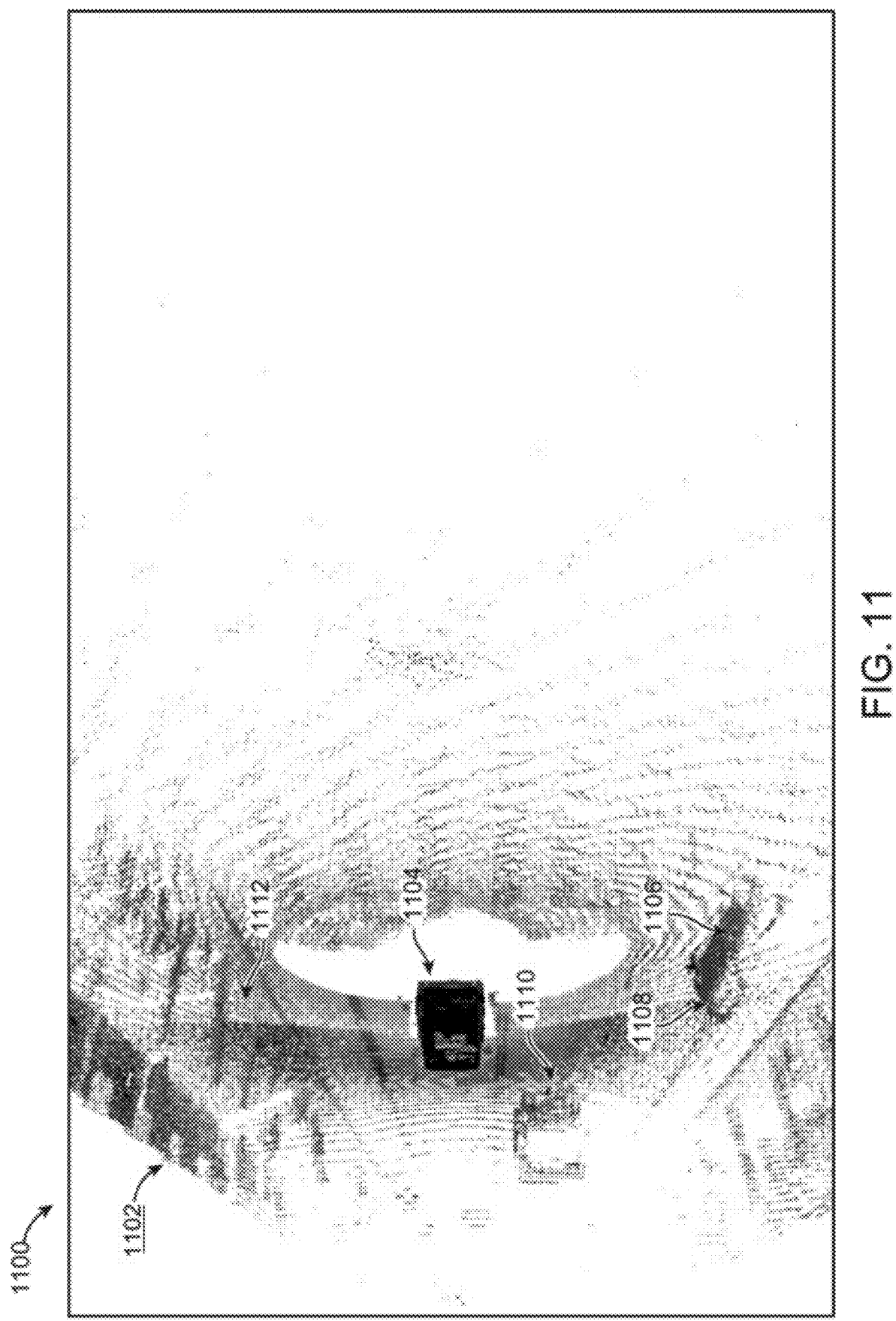
FIG. 11 illustrates an example of a display showing a rear aerial view of a vehicle model and point cloud, according to some embodiments.
Figure 12:
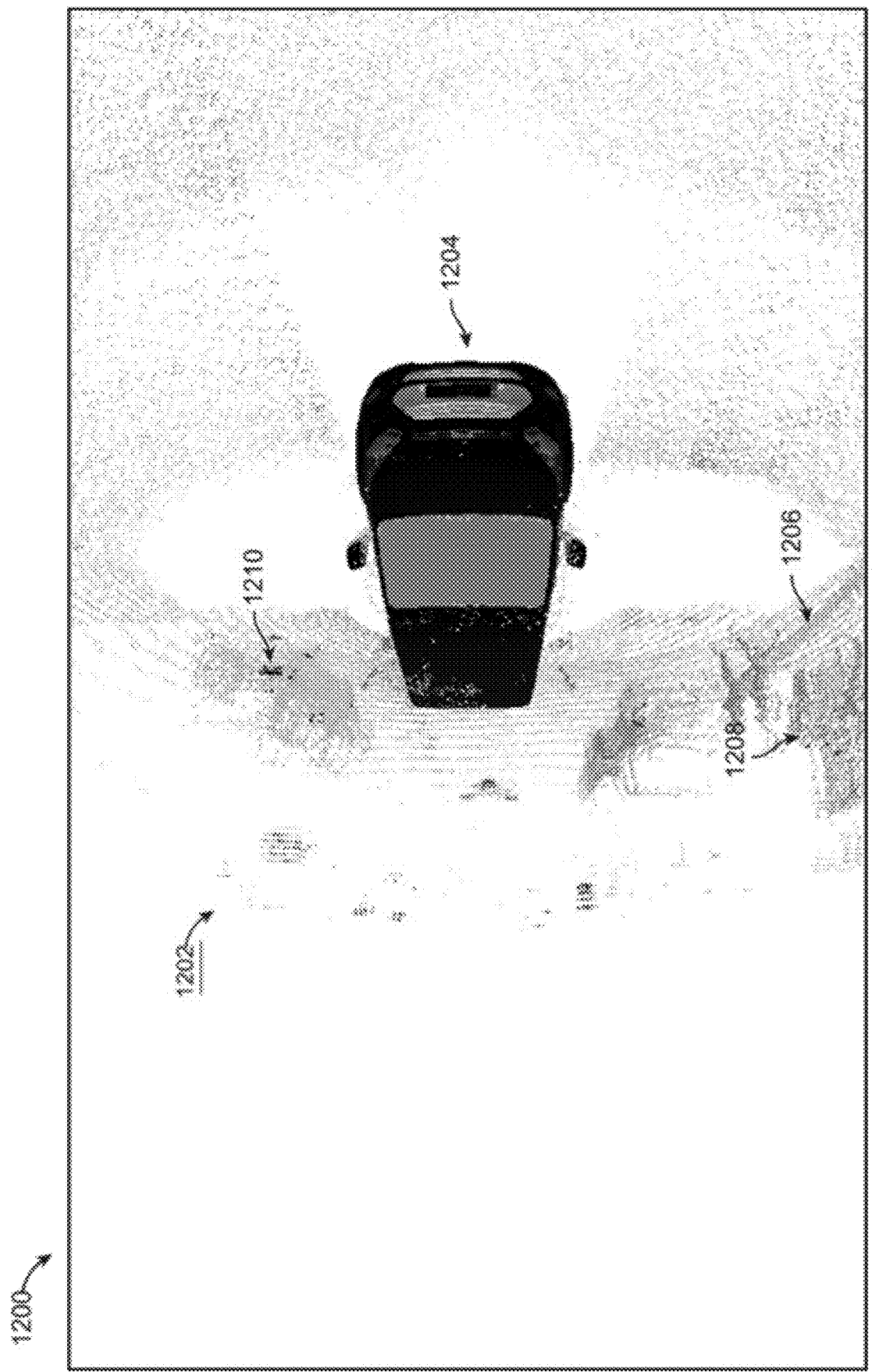
FIG. 12 illustrates an example of a display showing a front aerial view of a vehicle model and point cloud, according to some embodiments.
Figure 13:
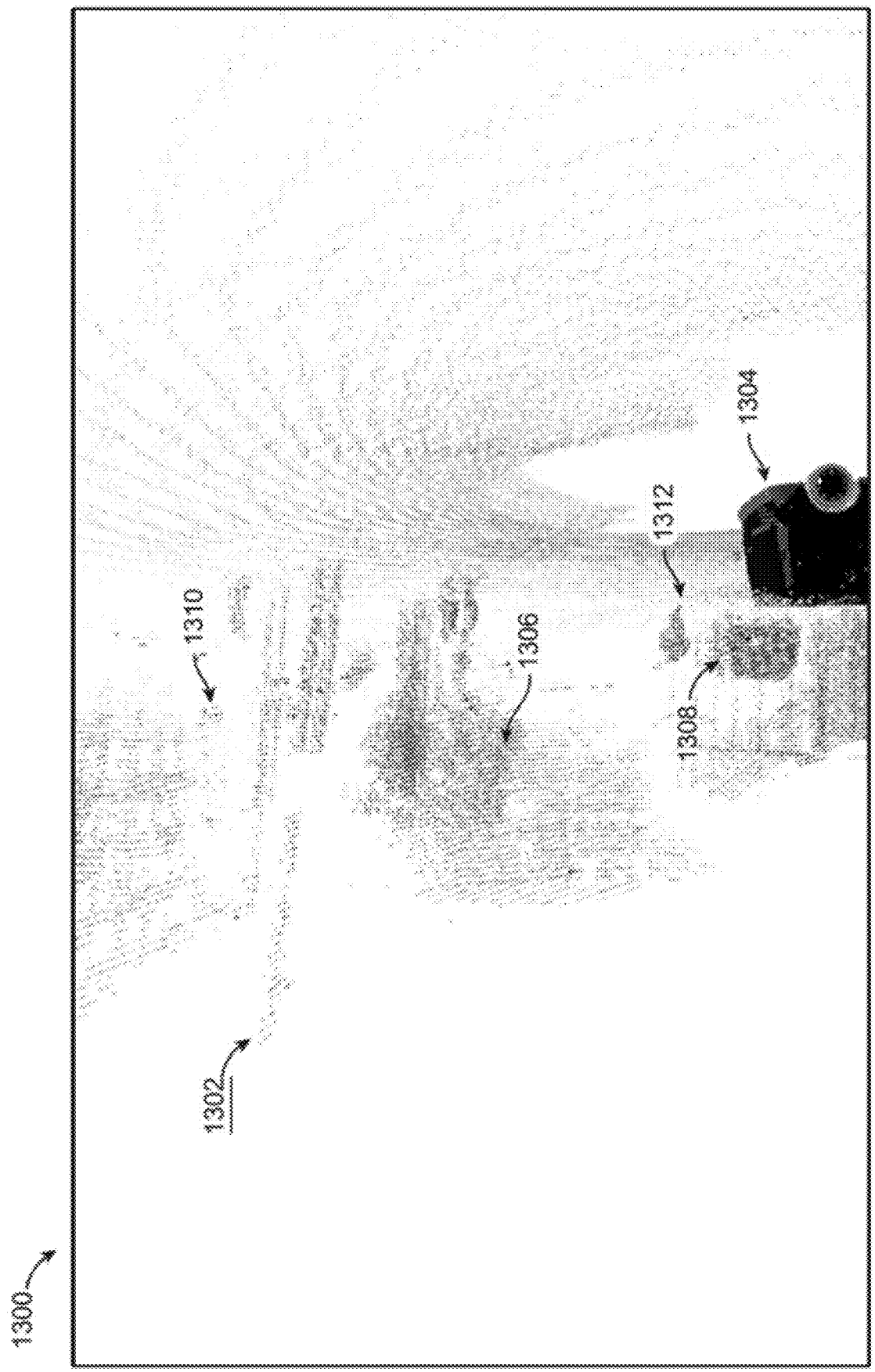
FIG. 13 illustrates an example of a display showing a rear side view of a vehicle model and point cloud, according to some embodiments.
Figure 14:
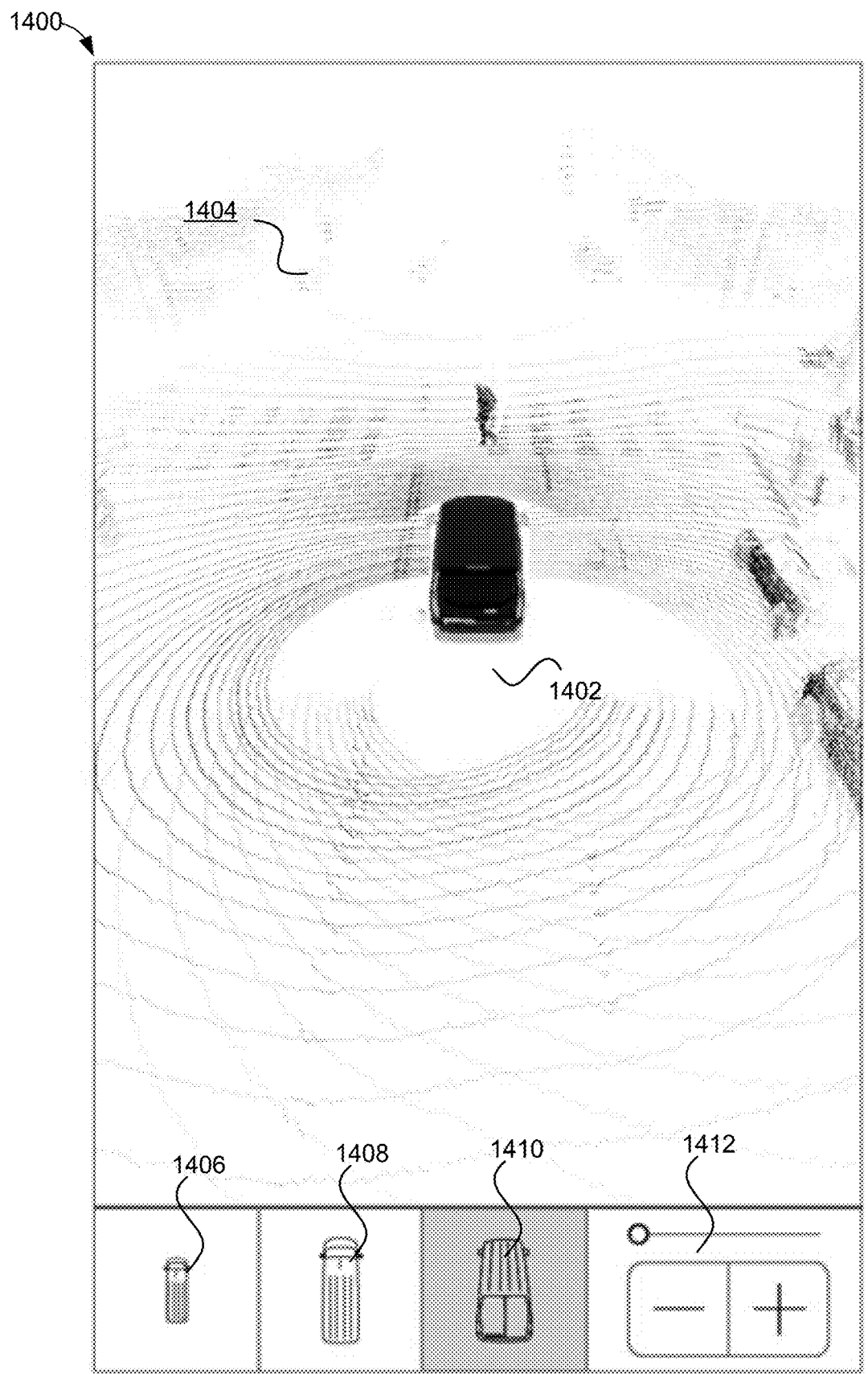
FIGS. 14-15 illustrate examples of displays showing a vehicle model, point cloud, and interface elements for adjusting views thereof, according to some embodiments.
Figure 15:
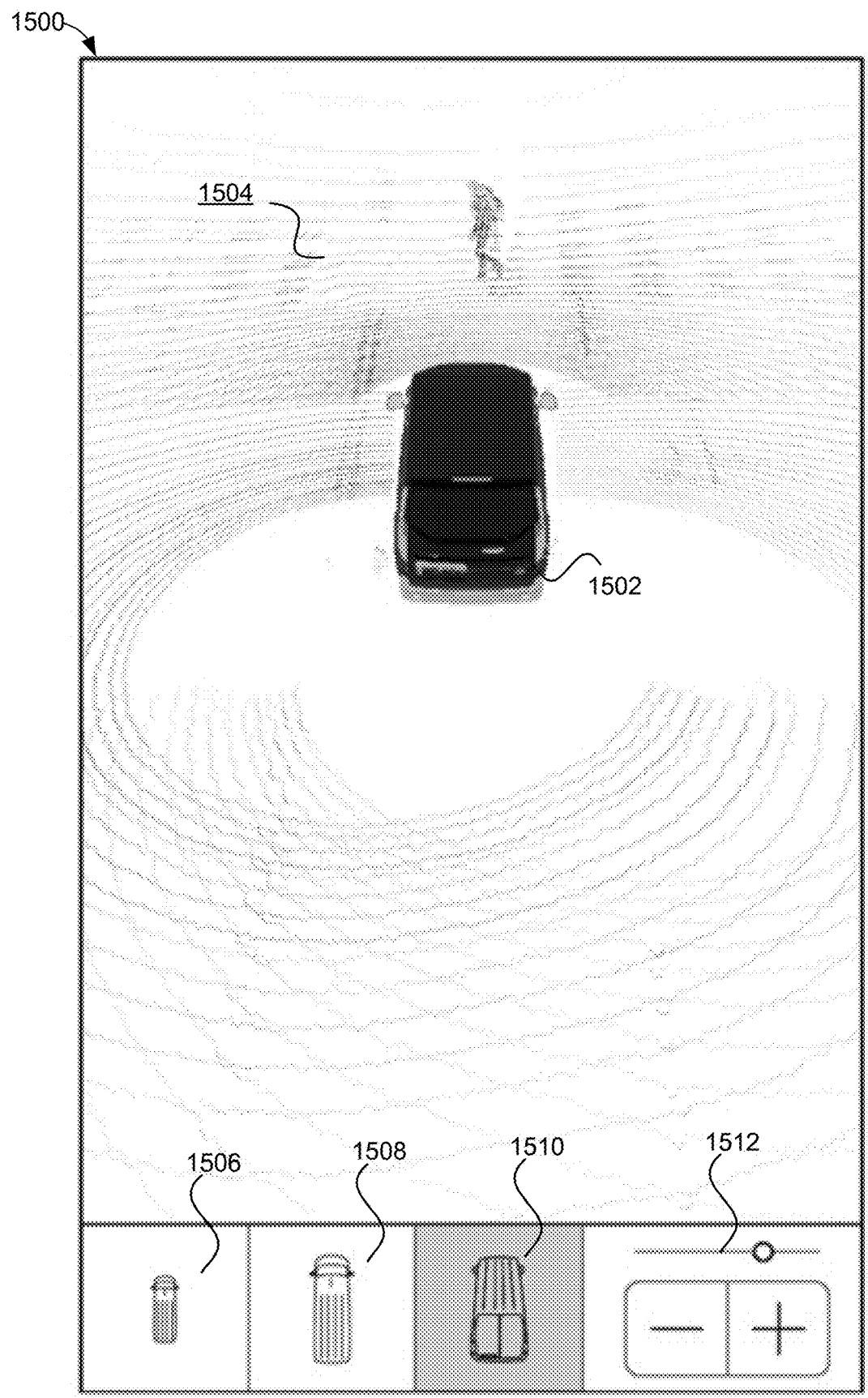

In some implementations, a user can select when to change the virtual camera pose, using a user interface. A user interface may accept user input 522 comprising an indication of a change in the virtual camera. For example, the user interface may display elements for user selection of a pre-defined pose, as illustrated in FIGS. 14 and 15. As a specific example, a user can tap a screen to change the pose to a next pose specified in a predetermined series, e.g., of a series of 4-8 predetermined views). In other implementations, a particular location on the display screen can correspond to a particular view, such that a user can select a particular view with a tap. In yet other implementations, verbal commands can be used to select a specific virtual camera pose, e.g., by saying "display rearview," "display top-down view" (e.g., as shown in FIG. 9), "display zoomed top-down view" (e.g., as shown in FIG. 10), "display rear aerial view" (e.g., as shown in FIG. 11), "display front aerial view" (e.g., as shown in FIG. 12), and "display rear side view" (e.g., as shown in FIG. 13). Responsive to user selection of a pre-defined pose, the user input may be transmitted to the triggering device 520.

In some embodiments, a user can specify their own views and save them. For example, a camera can be moved within a 3D environment until a desired view is obtained. Then, a save command can be provided. Separation vectors for the newly saved pose can be saved at that time for certain embodiments. In this manner, a user can customize views that can be quickly selected. A particular voice command can be tied to a newly created pose.

A trajectory processor may be configured to determine trajectory data 524. The trajectory processor may, for example, analyze the distance vectors 506 to determine the trajectory of the vehicle. Techniques for determining trajectory data are described in detail in section V(B). A proximity processor may be configured to determine proximity data. The proximity processor may, for example, detect a proximity breach, as described in section V(C).

For a given virtual camera pose, a separation vector 508 can be determined from each of the LiDAR device(s). A translation module 510 can use the current virtual camera pose to determine a proper set of separation vectors 508. The translation module 510 can compute the separation vectors 508 on the fly. Alternatively, or additionally, the translation module 510 may retrieve stored separation vectors 508, e.g., if a pre-defined pose is selected. The translation module 510 may determine translated vectors 512, representing a distance of an object from the virtual camera at a particular pose. Based on the distance vectors 506 and the separation vectors 508, the translation module 510 can determine translated vectors 512. For example, the translated vector 512 may be computed as the vector sum of a separation vector 508 and a distance vector 506.

The translated vectors 512 can be provided to a rendering engine 514. In some embodiments, the translated vectors 512 are filtered, before providing the translated vectors 512 to the rendering engine 514, such that the translated vectors 512 received by the rendering engine 514 include a subset of the translated vectors 512 that are within the field of view of the virtual camera. In other implementations, the rendering engine 514 can select the translated vectors 512 corresponding to locations that are viewable to the virtual camera. The translated vectors 512 for a given virtual camera pose (e.g., nominally referred to as a first pose) can be used to determine the image corresponding to the particular field of view for the current pose.

The rendering engine 514 can determine which pixels in the field of view 516 correspond to the distance vectors 506, and thus correspond to locations that were measured in the environment. The rendering engine 514 transmits the pixels in the field of view 516 to a display 518 for display. The rendering engine 514 can select a color for the pixels that correspond to the distance vectors 506. The other display pixels can be kept the color of the background, e.g., black or white. In some implementations, the color of a pixel can be determined based on a distance to the object relative to the virtual camera and/or the vehicle. For example, an object (such as a car) that is in close proximity to the vehicle can be colored red. The distance from the vehicle (e.g., the center of the vehicle or a point of interest on the exterior of the vehicle such as the point closest to a particular object) may be determined based on the distance vector and a model of the vehicle.

V. CONTEXTUAL POINT OF VIEW SWITCHING TO DRIVER DISPLAY

In various embodiments, the triggering device can change the virtual camera pose based on a user input and/or a trajectory of the vehicle. For example, when the vehicle is backing up, a rear view can be displayed. Such trajectory information can be received from the vehicle itself. A transmission state (e.g., reverse) can be sent to the computing system, which is connected to a control unit of the vehicle. As further examples, when the vehicle is moving forward, the relative pose of the virtual camera relative to the vehicle can move forward with increasing speed or increasing transmission state. For instance, in a top-down view, the virtual camera can move forward from a central point about the vehicle by about a foot or 30 cm for every increase of 10 mph.

In other implementations, the computing system can use ranging data to determine a trajectory, e.g., using GPS data or by determining a vehicle odometry. For example, if the ranging data indicates the vehicle is turning right (e.g., by object on the right getting closer and objects on the left getting farther away), the display can show a view of the right side of the vehicle. For instance, the virtual camera can be shifted to the right when providing a top-down view. As another example, the virtual camera can be placed at a rear bumper, e.g., facing forward at an angle that is determined based on an angular acceleration of the vehicle.

The selected display can depend on a current display, e.g., shifting the virtual camera relative to the vehicle for a turn. If a different view was currently being displayed (e.g., rear aerial view of FIG. 11), the virtual camera can pan right. The view may further be modified by zooming in or zooming out. In some embodiments, the zoom level can change independently from the virtual camera position and orientation. For example, as shown in FIGS. 14 and 15, virtual camera pose and zoom level may be separately tunable via user input to a user interface.

Another example trigger for changing the view on the display is a proximity trigger. A proximity of environmental surfaces to a primary model of an exterior of the vehicle can be tracked as described below in sections V(B) and V(C). The triggering device can comprise a proximity processor that detects a proximity breach of the plurality of environmental surfaces to the primary model. A proximity breach can be when an environmental surface gets too close to the primary model, e.g., within a threshold distance.

Depending on a location of the proximity breach, the virtual camera can be moved toward the proximity breach. For example, a top-down view can be shifted laterally toward the location of the proximity breach. In another example, the virtual pose of the camera can be positioned at the point of the breach on the primary model and pointing outward.

A. Displaying Dynamic Point Clouds

Figure 6:
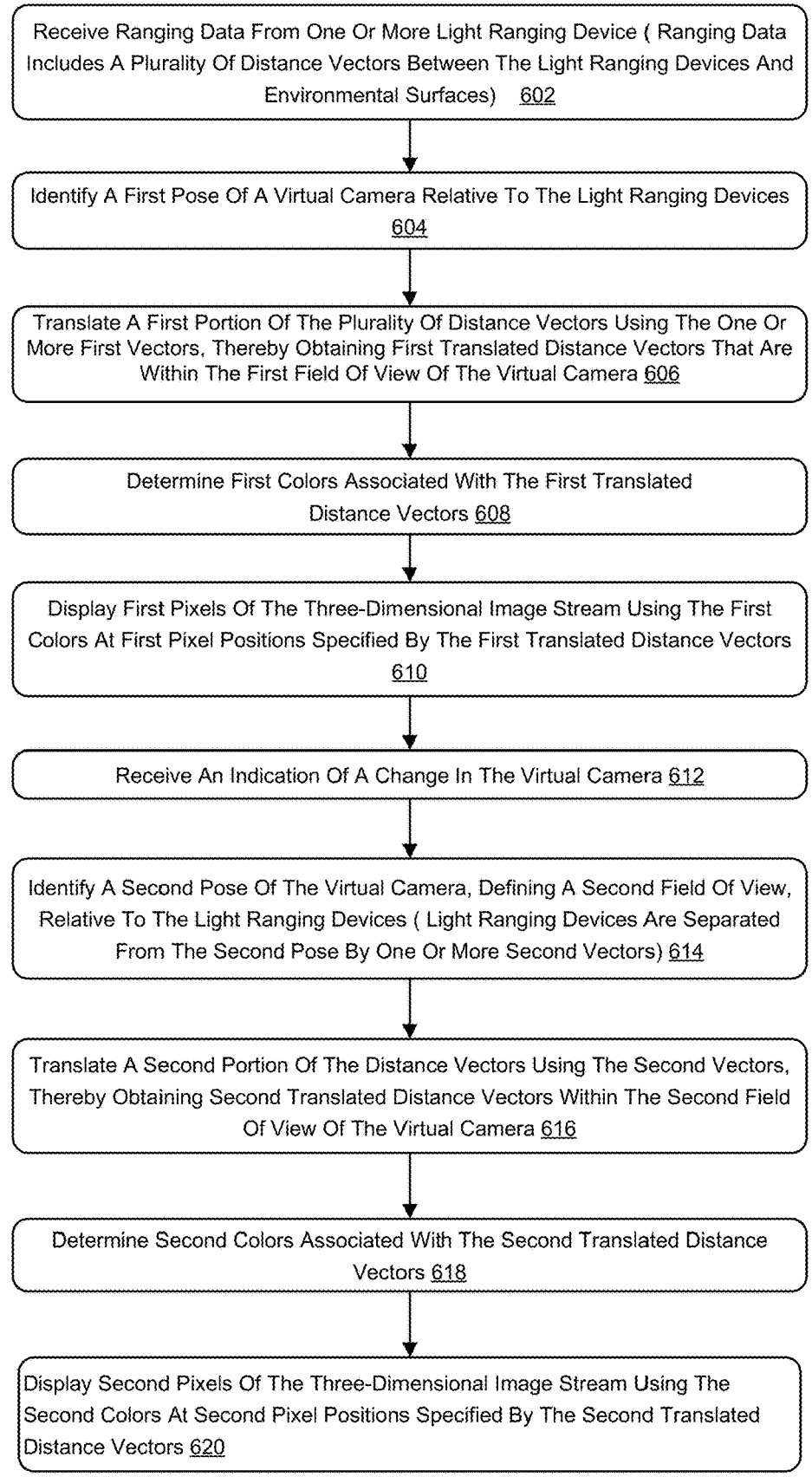
FIG. 6 is a flowchart illustrating a method for displaying dynamic point clouds, according to some embodiments.

FIG. 6 is a flow chart illustrating techniques for displaying dynamic point clouds, according to some embodiments. The method may be performed using a light ranging system of a vehicle. The light ranging system may include a control unit communicatively coupled with one or more light ranging devices installed on the vehicle (e.g., as illustrated in FIGS. 1-4B). The one or more light ranging devices may provide ranging data that includes a plurality of distance vectors between the one or more light ranging devices and a plurality of environmental surfaces. Each distance vector of the plurality of distance vectors corresponds to a pixel of a three-dimensional image stream. Based on the information generated by the light ranging system, a computing system may perform the following operations.

Prior to the processing depicted in FIG. 6, the light ranging devices may continuously survey the environment surrounding the vehicle to generate ranging data that may be sent to the control unit for processing. Many measurements of the environment may be performed every second so that a time sequence of ranging data may be generated to have sufficient temporal resolution to capture incremental changes in position for fast moving objects and surfaces in the environment. In one embodiment, for example, a high number of scans may be performed every second so that multiple measurements of an environmental object may be made while the object travels. Multiple measurements may be made over a short period of time so as to detect a breach within a threshold proximity value, even when the vehicle is traveling at a speed of over 160 miles per hour.

The ranging data collected by each of the light ranging devices may comprise the position of the light ranging device generating the ranging data. In one embodiment, the position of the light ranging device may be set as an origin position having x, y, and z coordinates of 0,0,0, wherein the origin position may be used as a reference point for further measurements collected by the light ranging device. Alternatively, the position of the light ranging device as represented in the ranging data may have the same coordinates as the position of the light ranging device as represented by the primary model of the vehicle.

In yet another embodiment, the position may also be defined as a distance vector from an origin position, wherein the origin position may further correspond to the origin of the primary model. The ranging data may further comprise a plurality of distance vectors corresponding to a plurality of points on objects and surfaces in the environment. The distance vectors may be defined relative to the position of the light ranging device generating the ranging data comprising the distance vectors. A memory can store an origin position for the primary model, where the one or more model positions are defined relative to the origin position. The common coordinate frame can allow the distance vectors to be defined relative to the one or more model positions of the one or more light ranging devices.

In addition to surveying the environment around the vehicle, the control unit may also run a real-time odometry algorithm, such as a real time simultaneous localization and mapping (SLAM) algorithm or statistical filter or some combination thereof, which combines LIDAR data with any of the following—GPS, IMU, camera and other vehicle sensor data to estimate the current six degrees of freedom for velocity, acceleration, and position of the vehicle in the environment. This real time vehicle state information may be fed into any downstream algorithms that require knowledge of the current vehicle state (e.g., velocity, acceleration, etc.) to calculate some types of risk values.

At step 602, the computing system receives ranging data from the one or more light ranging devices. The computing system may receive the ranging data to the computing system via one or more communication channels. For example, the light ranging devices may stream ranging data to the computing system via a wired or wireless connection.

At step 604, the computing system identifies a first pose of a virtual camera relative to the one or more light ranging devices. The first pose defines a first field of view of the virtual camera. The first pose may, for example, correspond to a default or user selected virtual camera pose, as described in section IV. The one or more light ranging devices are respectively separated from the first pose by one or more first vectors (e.g., the separation vectors 508 of FIG. 5).

At step 606, the computing system translates a first portion of the plurality of distance vectors using the one or more first vectors. The computing system thereby obtains first translated distance vectors that are within the first field of view of the virtual camera. A translated distance vector may represent a distance between the virtual camera and an environmental surface. The computing system may compute each first translated distance vector based on a distance vector and a first vector (e.g., as the vector sum of the two).

At step 608, the computing system determines first colors associated with the first translated distance vectors. The computing system may, for example, store mappings of different ranges of distance vector absolute values to different colors. The computing system may use the stored mapping to identify the first colors.

At step 610, the computing system displays, on a display device of the computing system, first pixels of the three-dimensional image stream using the first colors at first pixel positions specified by the first translated distance vectors. The computing system may, for example, merge the translated distances with the position of pixels at which these data originated and relative positions of these pixels at a time that these data were collected to form a 3D image, as described in section IV. The computing system may render the pixels for display and transmit instructions to the display device thereby causing display of the pixels. Examples of such displays are illustrated in FIGS. 9-15.

In some embodiments, the computing system may refrain from displaying certain pixels. For example, the computing system may render pixels corresponding to points in an environmental surface which are below a certain altitude, refraining from rendering pixels corresponding to points in an environmental surface above the altitude. This can help improve viewability of the display (e.g., at a glance) by making the display less crowded. The computing system may refrain from, for example, rendering points of a tunnel ceiling so as to not occlude the other objects and obstacles in the display.

At step 612, the computing system receives an indication of a change in the virtual camera. In some embodiments, the indication of the change in the virtual camera may be received via user input. For example, the indication of the change in the virtual camera is received at a user interface that receives user input corresponding to the indication of the change in the virtual camera, as illustrated in FIGS. 14-15. The indication of the change in the virtual camera may specify a change in pose and/or a change in zoom level.

Alternatively, or additionally, the computing system may determine an indication of a change in the virtual camera based on proximity and/or trajectory calculations. For example, if an object is detected near the rear of the vehicle, the computing system may determine that it should transition to a view that best illustrates the object and the rear of the vehicle. In some embodiments, the indication of the change in the virtual camera may be received at a proximity processor that detects a proximity breach of the plurality of environmental surfaces to a primary model of an exterior of the vehicle.

As another example, the indication of the change in the virtual camera is received at a trajectory processor. The trajectory processor may receive trajectory data from the vehicle. The trajectory data may include direction information, velocity information, acceleration information, and/or a transmission setting of the vehicle (e.g., whether the vehicle is in reverse, drive, sport mode, and so forth). The trajectory processor may determine a trajectory of the vehicle using the trajectory data. To determine the trajectory, the trajectory processor may analyze the plurality of distance vectors to determine the trajectory of the vehicle. Techniques for determining a trajectory of a vehicle are further described below in section V(B). Accordingly, the ranging data (which may include the distance vectors) may be used to provide the indication of a change in the virtual camera.

At step 614, the computing system identifies a second pose of the virtual camera relative to the one or more light ranging devices. The second pose defines a second field of view of the virtual camera. For example, the second pose may correspond to a second predefined pose selected by a user. Alternatively, or additionally, the trajectory processor may determine a new pose of the virtual camera based on the trajectory. The trajectory processor may determine that a current position of the virtual camera is to change based on the trajectory. For example, if the vehicle turns, the optimal pose of the virtual camera may change to account for the new direction of the vehicle. The optimal zoom level may also change, and be automatically adjusted, based on trajectory information.

The computing system may look up data characterizing the second pose. The one or more light ranging devices are respectively separated from the second pose by one or more second vectors (e.g., the separation vectors 508 of FIG. 5). The computing system identifies the second pose of the virtual camera in response to the indication of the change in the virtual camera (e.g., based on trajectory data, user input, and/or proximity data).

At step 616, the computing system translates a second portion of the plurality of distance vectors using the one or more second vectors. Translating the second portion of the plurality of distance vectors may be executed in a similar fashion as described above with respect to translating the first portion of the plurality of distance vectors at step 606. The computing system thereby obtains second translated distance vectors that are within the second field of view of the virtual camera.

At step 618, the computing system determines second colors associated with the second translated distance vectors. The computing system may, for example, store mappings of different ranges of distances to different colors. The computing system may use the stored mapping to identify the second colors. The second colors may be the same as the first colors, e.g., when using a black and white display. Such a same color is still associated with a distance vector, as the same color is associated with all distance vectors.

At step 620, the computing system displays, on the display device of the computing system, second pixels of the three-dimensional image stream using the second colors at second pixel positions specified by the second translated distance vectors. As described below with respect to FIGS. 9-13, different pixels may be displayed in different colors to indicate different distances.

In some embodiments, the computing system may use additional factors in determining colors associated with different pixels. For example, moving objects can be colored differently than stationary objects. Distinctions between moving and stationary objects can be determined by comparing relative poses of the surfaces to each other at different times. If two surfaces are static, they will stay at the same relative poses to each other, whereas a moving object will become closer or further away from a static object. Different kinds of objects (e.g., car, truck, bicycle, or pedestrian) can be colored differently. Once an object is identified (e.g., using a machine learning model or using specified heuristics) all the pixels of an object can be colored similarly.

The intensity of signals detected from a location in the environment can be used to display patterns in the environment, e.g., using different colors, shades, or brightness. For example, the intensity of the reflected light off of a painted crosswalk will be different than the intensity off of the road. In this manner, the outline of a crosswalk can be detected and displayed. The detection of intensity for detectors (e.g., composed of single-photon avalanche diodes (SPADs)) can be performed by determining a number of SPADs that fire during a time bin and/or across neighboring time bins, e.g., as described in PCT Patent Publication WO 2018/160886, which is incorporated by reference in its entirety for all purposes. The intensity can be used to determine a shade (e.g., greyscale) for displaying a pixel and groups of pixels.

Alternatively, or additionally, a post-processing may be applied to the intensity values to improve contrast. As a specific example, an exponential function may be applied to points identified on the ground, to help make a crosswalk more clear on a display. Besides crosswalks, other examples can be graffiti or signs on buildings, which can provide greater positional cues to a driver.

In some embodiments, color values for pixels can be determined using cameras, with color values from the cameras being matched to depth values from the LiDAR images. Techniques for matching color values to depth values are described in U.S. Patent Publication 2018/0329066, which is incorporated by reference in its entirety for all purposes.

The displayed image of the vehicle being driven can correspond to the actual vehicle being driven. The displayed image of the vehicle may correspond to a "primary model," which can be determined by surveying the vehicle with a LiDAR device, as described above in Section III. Further, signage on the vehicle (e.g., for a company vehicle) can be displayed. Such signage can be determined from a model provided by the company. For instance, a computer-aided design (CAD) model of any size may be provided by the company, and the model can be stretched (e.g., using textures) to fit the primary model of the particular vehicle being driven. Such a CAD model could also be provided by a manufacturer of the vehicle, or any other source. In this manner, a 3D model graphic shown to users is aligned with the true exterior of the vehicle. This way, the user can trust that the distances between objects and the 3D Model on the display match the real world.

B. Tracking Vehicle Trajectory (Odometry)

In some embodiments, the computing system may use odometry techniques such as SLAM to determine a vehicle trajectory. For example, "open-loop SLAM" can be used to iteratively perturb or update the trajectory using sensor data (e.g., ranging data) such that sensor data is locally consistent, so as to recover a best estimate of vehicle trajectory given the sensor data. For example, a set of points previously sampled by light ranging may be considered locally consistent if, after the points have been transformed according to the trajectory, the distance between every point to one or more spatially proximal other points (sampled at a later time) is minimized for a majority of said subset. The points within the majority (inliers) may be assumed to correspond to static objects in the environment, and the remainder points may be assumed to correspond to moving objects or outliers caused by sensor noise, atmospheric effects, and so on. The inlier set (i.e., data points for static objects) may be stored for use in determining one or more variables (e.g., speed, velocity, acceleration, etc.) and one or more risk values.

Motion distortion can arise when a LiDAR system and other sensors continuously output data (e.g. by scanning at a high rate) or by outputting data at different rates relative to one another, so that within the duration of one frame (e.g. 0.1 seconds), various data sampled at different times within the frame may correspond to different vehicle positions when the vehicle is moving. Some embodiments can partially compensate for motion distortion using an external pose source, such as an inertial navigation system or visual odometry, and then treat the point clouds rigidly. In such methods, inevitable drift in motion estimates can cause each point cloud to remain slightly warped, hampering registration accuracy. To achieve the best accuracy, the vehicle's trajectory can be solved directly using the LiDAR point cloud.

Every point in a current frame can be associated with the nearest point from the previous frame. Sparsity and sampling patterns by a LiDAR can bias the result, and the large number of points produced by a typical LiDAR makes real time performance challenging. Feature extraction can be used to decimate points for computational efficiency and also to avoid the influence of sampling bias.

The literature on rigid point set registration algorithms is largely covered by reviews by Tam et al and Pomerleau et al. The most well-known of these is iterative closest point (ICP), and, more recently, generalized ICP and normal distributions transform. Variants of rigid ICP can have point clouds preprocessed assuming constant motion from the previous frame, and then registered. Other implementations can preprocess point clouds with the motion estimate from an unscented Kalman filter, then rigidly registers them with correlative scan matching.

At the cost of additional complexity, solving for the vehicle's continuous motion directly using nonlinear methods tends to be more accurate than the two-step approach of de-warping and rigid registration. Among continuous time methods, two primary techniques are the non-parametric approach of Gaussian processes and the parametric approach of interpolating between a discrete set of control poses with splines or piecewise linear functions. In some embodiments, a trajectory can be represented as a collection of discrete samples at an arbitrary rate, which may not be at the same rate as the frame rate of sensors.

Parametric approaches can use B-splines or piecewise linear functions to interpolate between a discrete set of control poses, or spline knots. Bibby and Reid proposed using cubic B-splines to represent 2D rigid motion. Alismail et al proposed continuous ICP, which models 3D rigid motions with a cubic B-spline in the six-dimensional space consisting of a Gibbs rotation vector and xyz translation. Zhang et al proposed a method which uses a piecewise linear interpolation in the space of Euler angles and xyz translation (the paper claims to use the angle-axis representation but the source code uses Euler angles) to coarsely estimate the vehicle's motion via dead reckoning in the frontend, and then uses rigid ICP-like registration to correct for drift. Zlot and Bosse use quaternions and xyz for their rigid body parametrization, and their algorithm is also divided into a frontend and a backend, with piecewise linear functions for the frontend sliding window filter and cubic B-splines for a batch optimization in the backend. Dubé et al modify the front end of the algorithm of Zlot and Bosse to use non-uniform knot spacing between piecewise linear interpolation. This results in a more computationally efficient open loop front end.

Spline representations of 3D rigid motions are challenging because it is difficult to rigidly transform smooth splines, and rigid motion parametrizations become ambiguous or singular for large rotations. Anderson and Barfoot sidestep the issue by modelling the velocity instead of the pose with cubic B-splines in $\mathfrak{se}(3)$ space, the Lie algebra associated with rigid motions. A drawback is that numerical integration is needed to recover the pose from the velocity spline. Small errors in any spline knot may lead to a large difference in pose in the future.

TABLE 1

Summary of approaches to LiDAR pose estimation. Some
methods use different trajectory representations for
the frontend and backend, here separated by a semicolon.
For interpolation-based methods, unless otherwise specified,
control pose spacing is uniform in time.

| Method | Pose | Trajectory |
| --- | --- | --- |
| Moosmann | Axis-angle + xyz | Rigid |
| Zhang | Euler angles + xyz | Linear; Rigid |
| Alismail | Gibbs vector + xyz | Cubic B-splines |
| Zlot | Quaternions + xyz | Linear; Cubic B-splines |
| Anderson | se(3) (velocity) | Cubic B-splines |
| Kohler | Axis-angle + xyz | Rigid with UKF; Rigid |
| Dubé | Axis-angle + xyz | Linear (non-uniform) |

By using trajectory parametrization based on composing a plurality of B-splines in 6-dimensional se(3) space, the vehicle's motion can be determined. In one example, the light ranging system can detect vehicle position in a busy urban environment.

The odometry techniques can use light image data from a light imaging system and estimate the change in the data over time (e.g., the change in distance vectors over time). A light ranging system can detect a position of a vehicle equipped with the light ranging system in real time using a spinning LiDAR sensor by directly estimating the vehicle's continuous trajectory. In one example, the odometry data collected by the light ranging system can be supplemented with GPS data to more accurately determine a position of the car in real time.

In one example, the light ranging system can detect and approximate a surface environment around the vehicle. The light ranging system can detect which types of surfaces detected are static surfaces and which types of surfaces detected are dynamic or moving surfaces. In one example, the light ranging system can color code objects that the light ranging system detects are moving objects, stationary objects, the ground, and humans into different colors.

C. Proximity Calculations

In some embodiments, the ranging data collected by the light ranging devices may be used to compute proximity values for points on environmental objects and surfaces relative to the primary model of the vehicle. A proximity value may refer to the extent to which environmental objects or surfaces are physically and geometrically approaching the vehicle as to place the vehicle at risk of collision. In alternative embodiments, a more generalized risk value may also be determined to measure the likelihood of other dangers relating to the operation of the vehicle, such as whether a vehicle may be turning too quickly such that it has a risk of tipping over. A risk value may be determined based on additional measurements and derived measurements about a vehicle's trajectory, such as a vehicle's rotational velocity that may be determined based on changes to reference points in the environment within a coordinate frame of a model of the vehicle and the environment, or determined by simultaneous localization and mapping techniques that may be used for estimating vehicle odometry.

The proximity of environmental objects and surfaces may be compared with a threshold proximity value to determine when there may be a risk that environment objects and surfaces may collide with the vehicle. In one embodiment, proximity of environmental objects and surfaces may be defined based on the distances of the environmental objects and surfaces such that the system may detect when environmental objects and surfaces are getting too close to the vehicle when the proximity of the environmental objects and surfaces satisfy the proximity threshold. Accordingly, the threshold proximity value may be represented as a threshold distance and applied to the primary model so that the control unit may construct a proximity shell around the primary model to represent a region around the vehicle exterior where the proximity threshold may be breached.

It is understood that proximity may also be defined based on other factors, such as a function of the distance and relative velocity between an environmental object and the exterior of the vehicle. For example, an environmental object may be located at a substantial distance away from the vehicle, such as being 10 meters away from the vehicle, but have a relative velocity that is moving quickly towards the vehicle, such as a relative velocity towards the vehicle 600 of 20 meters per second. The velocity can be determined using changes over time in the distance vector from a light ranging device to a particular environmental object (surface). A function may then be applied to the distance and relative velocity of the object to determine an overall proximity value corresponding to the environmental object wherein the overall proximity value may exceed a proximity threshold. For instance, a time-to-contact value can be calculated for all points in the environment using the estimated velocity and position of every point with respect to the vehicle.

As mentioned above, a risk value may be determined based on additional measurements and derived measurements about a vehicle's trajectory. Once the light ranging system (potentially including the primary model of the vehicle and the model positions of the light ranging devices) has been calibrated, the light ranging system may be use used to assist with operating the vehicle. In one example, the light ranging system can detect, using image data, where the vehicle is at a given location relative to the ground or where the vehicle is at a given location relative to stationary objects in its environment, e.g., obtaining a trajectory of the vehicle.

In one example, the light ranging data used to estimate the vehicle's continuous trajectory can be used as a factor in determining a breach of risk based on a certain threshold value of risk. In one example, risk values determining how much risk is involved in when a vehicle is operated in a certain way can be more accurate.

For example, a light imaging system can detect a stop sign or a traffic light on the road when the vehicle is operational. When the light imaging system also determines from map data that there is indeed a stop sign at a given location, the light imaging system can more accurately determine if a certain risk or amount of risk was taken when operating the vehicle at a location generally around the stop sign.

In some embodiments, the control unit may analyze the ranging data, which may be in the form of imaging data, received from the light ranging devices. In one embodiment, a time sequence of ranging data comprising sets of distance vectors between a surface of an object and a particular ranging device at different moments in time may be analyzed to determine the movement patterns of objects and surfaces in the environment, while accounting for any movement of the vehicle. These movement patterns may include information about changes in the positions of environmental objects and surfaces and their velocity, direction, accelerations and other similarly measures relating to the movement patterns of environmental surfaces of objects. The control unit may then use such movement pattern data along with the distance vectors and positions of points in the environment to generate projected positions of points in the environment corresponding to where the points are predicted to move to after a predetermined time segment. This predetermined time segment may, for example, be set to 0.2 seconds, corresponding roughly to a typical reaction time for human drivers.

The control unit may determine one or more risk values (e.g., proximity or trajectory values) using the model of vehicle and all or some points in the environment, e.g., a reduced set of points. For instance, the location of clusters of points having a similar distance can be identified as corresponding to a same environmental surface. A distance vector can be determined to the geometric centroid of a cluster of points that have determined to be associated with one another. The risk value may be a function of distances or relative velocities between the vehicle exterior and points in the environment, or any other measurements derived from the ranging data collected by the light ranging devices, or any combination of the above, e.g., to determine a trajectory of the vehicle.

In one embodiment, the risk values may correspond to distances (e.g., a shortest distance) between points in the environment and the vehicle exterior. In this embodiment, the ranging data received by the control unit from the light ranging devices may comprise distance vectors between points in the environment and the light ranging devices generating the ranging data. The control unit may then convert these distance vectors to other distance vectors that measure shortest distances between all measured points in the environment and the vehicle exterior as represented by the primary model. The control unit may also determine distance vectors that measure shortest distances between the vehicle exterior as represented by the primary model and the projected positions of points in the environment.

In other embodiments, the control unit may also directly determine shortest distances, rather than distance vectors, between points in the environment and the vehicle exterior. The shortest distances may be calculated based on the primary model of the exterior of the vehicle and distance vectors between points in the environment and the light ranging devices. For example, the distance vectors collected by the light ranging devices may be defined relative to an origin position corresponding to the position of the first light ranging device on the vehicle exterior. The position of the first light ranging device on the vehicle exterior can then be matched with the position of the first light ranging device on the primary model to determine an x, y, and z coordinate for each point in the environment using the distance vector corresponding to the point in the environment. Accordingly, a distance between a point in the environment and a point on the vehicle exterior may be determined using the x, y, and z coordinates of the points in the environment and on the vehicle exterior.

For each point on the vehicle exterior, a distance between the point on the vehicle exterior may then be determined with a closest point in the environment. A binary search tree, such as a K-D tree may be used to determine the closest point in the environment to the point on the vehicle. The distance may then be used as a factor for calculating the risk value. Other factors, such as relative velocity and acceleration may also be considered when calculating the risk value as previously discussed.

A risk may be defined to encompass other types of risks relating to the operation of the vehicle. For example, a rotation velocity for the vehicle may be computed based on the ranging data collected by the light ranging devices and used to compute a risk value. The risk value that was calculated based on the rotation velocity of the vehicle may be used to detect when the vehicle is at risk of rolling over when the risk value satisfies a risk threshold. Other motion variables of a vehicle can also be determined, e.g., velocity straight ahead or an acceleration.

In other examples, odometry data may be used, as determined based on the changes in the distance vectors to the environmental surfaces. For example, an environmental surface can be identified as being stationary (static), e.g., by comparing relative positions of the surfaces to each other at different times. If two surfaces are static, they will stay at the same relative positions to each other, whereas a moving object will become closer or further away from a static object. Examples of a static surface can be a line marking on a road. As an alternative, moving objects can be identified, and then removed, thereby leaving static objects.

Once static surfaces are identified, changes over time of the distances vectors to these respective environmental surfaces can provide motion variables, such as velocity and acceleration. Such motion variables can be determined in various ways, as described herein. In some examples, the motion variables can be determined by subtracting the components (i.e., for different ones of three dimensions) of the distance vectors and determining a change per unit time, e.g., as a rate, such as speed or velocity. Differences in such rates can be used to determine an acceleration. A trajectory of the vehicle can be determined by determining a relative position compared to stationary surfaces at each time step. Some stationary surfaces will move out of range, while other ones will appear, with a sufficient time overlap to have a common reference frame.

Some embodiments can assume that a majority of points in a scene are stationary. Such an assumption would generally be true, e.g., as the ground and most objects at the sides of a road would be stationary. A map determined from the measurements of the objects in the environment can be aligned to determine a movement of the vehicle during the time period between measurements. As an alternative to using a map determined from the LiDAR measurements, some embodiments can localize (align) on a precomputed or pre-collected static map of the environment, which may be determined using similar techniques as the map determined using the vehicle's LiDAR. Thus, instead of matching to the previous couple images from the LiDAR system, the system can match its data to the 3D map that is already loaded in memory. Localizing to a map can be a robust approach that can provide global positioning information if the map has been computed into a global frame of reference, as is discussed in more detail later.

Accordingly, the calculation of the one or more risk values can include determining changes over time of the distance vectors to respective environmental surfaces of the plurality of environmental surfaces. At least one of the one or more risk values can correspond to a speed, velocity, or an acceleration of the vehicle, or combination thereof. For instance, a risk value can be speed, velocity, or an acceleration, or some function thereof. Such a function could be a weighted sum or average of various motion variables, such as a speed, a velocity, or an acceleration.

The control unit may compare the one or more risk values to a risk threshold to determine whether a risk value exceeds the risk threshold. Accordingly, a risk breach can be detected based on a risk value of the one or more risk values exceeding a threshold value. In various embodiments, a breach detection might require multiple risk values to exceed respective thresholds, and other criteria may be used as well.

There may be different types of risk thresholds including those based on distance or velocity. For example, the value of the risk threshold (also referred to as the threshold value) may be set to 30 centimeters. In such an example, a risk breach can occur when the risk value is below the risk threshold. When the risk value relates to a velocity, the breach may occur when the risk value is greater than the risk threshold.

VI. SEMANTIC LABELING OF VEHICLE SECTIONS

A model of an exterior of the vehicle can be stored as a collection (set) of points in a reference frame. These points may provide a 3D coordinate, e.g., in Cartesian coordinates. However, it can be advantageous to also provide an indication of which points correspond to which physical parts of a vehicle. For example, it can be beneficial for a driver to know which points correspond to a back bumper, a front bumper, a left front passenger door, a right front passenger door, a left back passenger door, a right back passenger door, a trunk, and so forth.

Semantic labels can be provided to identify which points correspond to which parts (regions) of a vehicle. In particular, a subset of the points of a model can be assigned a semantic label (e.g., front bumper). A data structure can identify a subset of points as corresponding to a same region of the vehicle and store the corresponding sematic label.

Accordingly, a model of an exterior of the vehicle can be stored in a memory of a computing system. The computing system can correspond to control unit 420 in FIGS. 4A and 4B. The model can comprise a set of three-dimensional points, e.g., as obtained by scanning the vehicle using a light ranging system. The model can include a plurality of regions on the exterior of the vehicle, e.g., as the model can include the entirety of the vehicle or a large section that includes multiple regions.

For each region of the plurality of regions on the exterior of the vehicle, a semantic label can be stored in the memory of the computing system, where the semantic label is stored in association with a subset of points of the primary model that define the region. The subset of points can be specified in a variety of ways, e.g., by defining a boundary of the region, by their specific coordinates, and as a list of identifiers corresponding to the points.

The identification of which points correspond to a region may be performed manually or automatically by a computer system. For example, a model may be displayed to a user, and the user can provide a boundary of a region, e.g., using a stylus on a touch-sensitive screen. The points within the boundary can then be identified as corresponding to the region. A user can be prompted to enter a semantic label or select from a list of pre-existing labels. As another example, a user can select individual points that are to be included in the subset corresponding to the region.

As a further example, a user can provide a camera image (or set of images, e.g., in a video) corresponding to a particular region. A camera image can be compared to the model to determine the model points that correspond to the pixels in the camera image. Multiple images can be used to detect an overlapping region in the images, where the overlapping region is compared to the model to identify the model positions within the overlapping region. Accordingly, the images can be used to identify the regions of the vehicle that are to be monitored.

In other embodiments, the points can be analyzed by a computer to determine which points belong to a region. Properties of the regions may be specified, e.g., a bumper can be defined as extending from a front bottom edge of the vehicle to a front top edge (e.g., defined as a change in slope from vertical to horizontal). Such a slope or contour of the vehicle can be determined by connecting the points, e.g., using planes or curves, where the connections among the points can be determined as a curve fit or by interpolation. Once a region is detected, the semantic label, which is associated with the defined properties used to determine the subset of points for the region, can then be stored in association with the subset of points, e.g., as described herein.

VII. MONITORING OF VEHICLE USING SEMANTIC LABELING

The semantic labeling can be used when monitoring the exterior of a vehicle for changes, such as scratches and dents. There are specific areas of a vehicle that may be required to review after a vehicle (e.g., one in a fleet) is used, or potentially all of a vehicle may need to be reviewed. Documentation of the review by camera or LiDAR may be needed. For instance, companies may mandate inspection reports be created for every driving session, e.g., a driver on a route. There may be pre-inspection and a post-inspection report that cover specific areas of the vehicle.

A. Comparison of Models Taken at Different Times

In some embodiments, scans can be taken at different times, and the two scans can be compared. For example, a primary model can be taken before a driving session, and a secondary model can be taken after the driving session. Or, the secondary model of a previous driving session can be used as the primary model of a current driving session. As a further example, if no changes were identified in a driving session, the primary model can be carried over for use the primary model for a next session.

In some implementations, the scans can be taken using a LiDAR system installed at a gate through which the vehicle leaves and enters. Other implementations can use a LiDAR system installed on the vehicle. As examples, the two models can be stored at a control unit of the vehicle or at a separate vehicle monitoring system (e.g., 450 in FIG. 4B).

FIG. 7 is a flow chart illustrating techniques for monitoring a vehicle using semantic labeling with vehicle models, according to some embodiments. The method may be performed using light ranging system of a vehicle that includes a control unit communicatively coupled with one or more light ranging devices installed on the vehicle (e.g., as illustrated in FIGS. 1-4B). Based on the information generated by the light ranging system, the control unit may perform the following operations.

At step 702, the control unit stores a primary model of an exterior of the vehicle in a memory. The memory may be part of the control unit or part of a computing system comprising the control unit. Alternatively, or additionally, the primary model may be stored to an external memory. As described above in Section III, the primary model may include a set of three-dimensional points corresponding to a plurality of regions on the exterior of the vehicle. The three-dimensional points may be obtained by scanning the vehicle using a light ranging system. The plurality of regions on the exterior of the vehicle may, for example, include the entirety of the vehicle or a large section that includes multiple regions.

At step 704, for each region of the plurality of regions on the exterior of the vehicle, the control unit stores, in the memory, a semantic label in association with a subset of points of the model that define the region. A subset of the points of a model such as the primary model can be assigned a semantic label characterizing the points as corresponding to a particular region of the vehicle. Examples of semantic labels include front bumper, driver side front door, and roof. A data structure can identify a subset of points as corresponding to a same region of the vehicle and store the corresponding sematic label.

At step 706, the control unit performs, using the one or more light ranging devices, one or more measurements of the exterior of the vehicle to generate ranging data that includes distances from the exterior of the vehicle to the one or more light ranging devices. Generating the ranging data may include continuously surveying the environment surrounding the vehicle to generate ranging data, as described above in section V(A).

At step 708, the control unit constructs one or more secondary models of the exterior of the vehicle using the ranging data. Constructing the secondary model may be performed in a similar fashion as constructing the primary model, using the ranging data generated at step 706.

At step 710, the control unit compares the one or more secondary models with the primary model to detect a first point having a change in the exterior of the vehicle.

In one embodiment, the primary model and the secondary model(s) may be defined relative to an origin position equal to the position of a first light ranging device (e.g., 430a of FIG. 4) and share the same x, y, and z axes. The secondary model(s) may be overlaid onto the primary model by placing the secondary models into the same coordinate system as the primary model and aligning the origin position of the secondary models with the origin position of the primary model. The alignment may be further refined by computing an error corresponding to the difference between the secondary models and the primary model and iteratively readjusting the orientation of the secondary models to minimize the error. The error may be computed using a variety of algorithms known in the art.

The control unit may compare the one or more secondary models with the primary model to compared to determine changes. This may be done by associating each point in the secondary model with the closest point on the primary model and computing a distance vector between those points. Accordingly, a set of distance vectors may be generated wherein each distance vector corresponds to a point on the primary model and a point on the secondary model.

Once a significant change (e.g., relative to a threshold) is detected in certain points of the models, any regions corresponding to the changed points can be identified. For example, a table can identify a corresponding region for each point, or the subsets of each region can be searched to identify that the changed points is within a particular subset of a particular region.

At step 712, the control unit determines that the first point is within a first region of the plurality of regions. The control unit may, for example, compare the first point to stored predefined regions, each region defined by a set of points.

At step 714, the control unit accesses the memory to retrieve a first semantic label associated with the first region. The control unit may, for example, access a stored mapping of regions to semantic labels. The control unit may compare one or more points in the first region (e.g., the first point, or the points constituting the first region) to a set of points in the mapping, and identify the first semantic label stored in association with the first region.

At step 716, the control unit provides a notification including the sematic label. For example, the notification may include text such as "Object too close to front bumper." The notification can be provided to various devices at various times. For example, the notification can be sent to a driver's mobile device. As another example, the notification may be stored for later analysis (e.g., the semantic label and another other relevant information is saved in a table of vehicle changes). The notification may be stored to local memory, e.g., memory 354 shown in FIG. 3. As another example, the notification may be sent to a module or other device (e.g., a server computer) for performing a statistical analysis of changes to vehicles driven by a particular driver or for a fleet, e.g., as for a dashboard depicted in FIGS. 9-17 of PCT Patent Publication WO 2019/113531, which is incorporated by reference in its entirety for all purposes.

In various implementations, the change events can be stored for each driver, or statistical values for a set of change event can be stored. For example, a number of change events for each semantic label can be counted and saved in a table, and then provided to a user upon request. For instance, a computer system can allow a user to select a particular driver (e.g., via a user interface providing a list of drivers). A software routine can then use an identifier of the driver to retrieve information about the change events from the table (e.g., as stored in other fields of a row of the table that corresponds to the driver). A display routine can provide the information in a manner specified by the user, e.g., a pie chart, bar chart, a 2D plot, etc.

If a notification is sent to a driver's mobile device, the driver can inspect the exterior of the vehicle at the identified point or at a region identified by a semantic label. The driver can then prepare a report only for times that a change event occurs. And, the driver can know exactly where to inspect the exterior, so such inspection can be performed quicker.

B. Use of Proximity Event to Detect Semantic Label

In some embodiments, a secondary scan is not needed. Instead, a LiDAR system installed on the vehicle can analyze external objects to detect proximity events where an object comes close to the vehicle, e.g., potentially making contact with the vehicle. Such a proximity detection (e.g., as described in section IV) can identify a region in a model where a change event might have occurred. The regions can be semantically labeled, and a notification can be sent, e.g., as described above. For instance, a driver can inspect the region corresponding to the semantic label. Further, a particular location of the region can be identified to guide the driver's inspection, or someone else's inspection.

Figure 8:
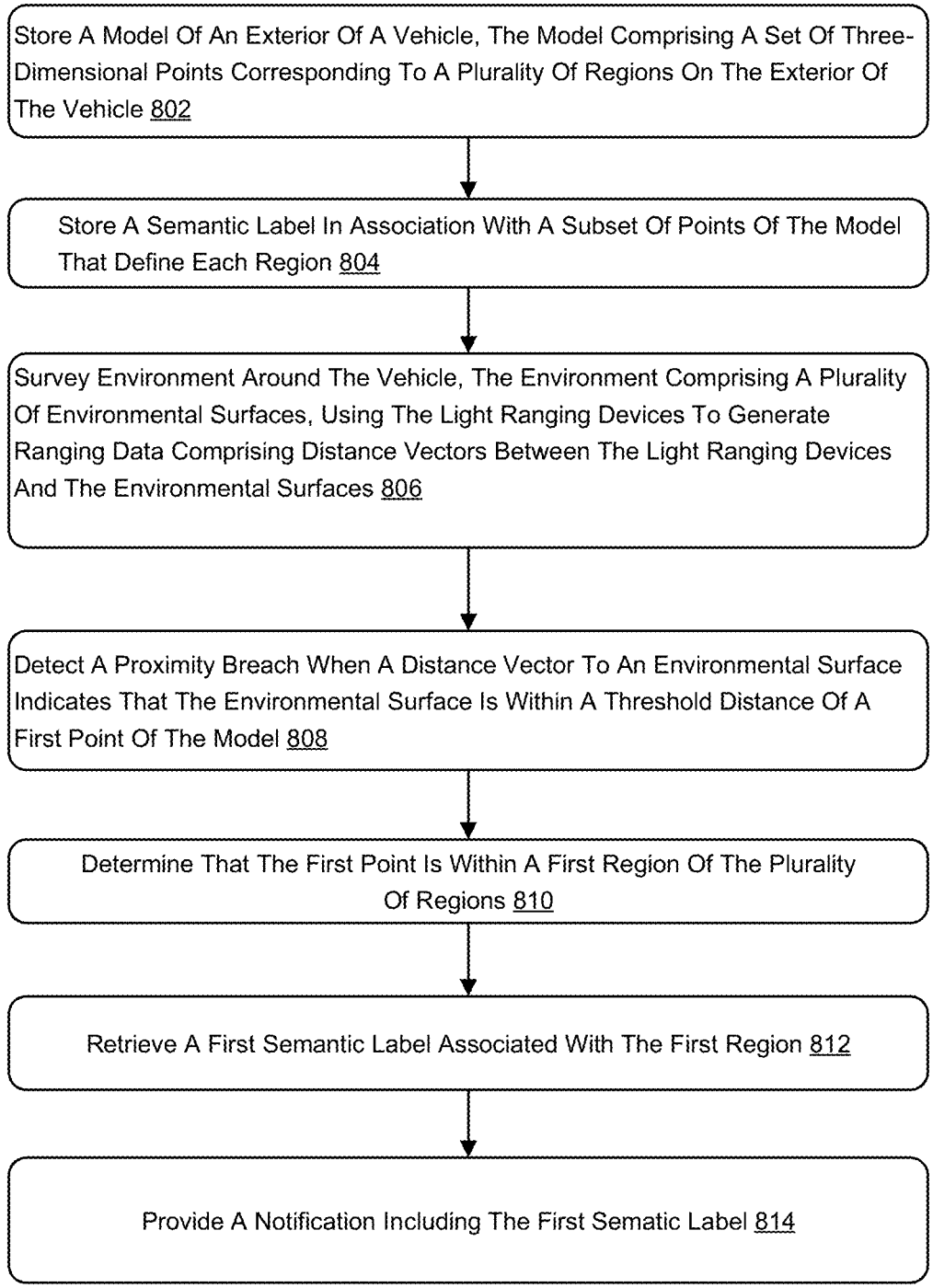
FIG. 8 is a flowchart illustrating a method for monitoring a vehicle using semantic labeling with a detected proximity breach, according to some embodiments.

FIG. 8 is a flow chart illustrating techniques for monitoring a vehicle using semantic labeling with a detected proximity breach, according to some embodiments. The method may be performed using light ranging system of a vehicle that includes a control unit communicatively coupled with one or more light ranging devices installed on the vehicle (e.g., as illustrated in FIGS. 1-4B). Based on the information generated by the light ranging system, the control unit may perform the following operations.

At step 802, the control unit stores a model of an exterior of the vehicle in a memory of the control unit. Step 802 may be performed in a substantially similar fashion as described above with respect to step 702 of FIG. 7.

At step 804, for each region of the plurality of regions on the exterior of the vehicle, the control unit stores, in the memory, a semantic label in association with a subset of points of the model that define the region. Step 804 may be performed in a substantially similar fashion as described above with respect to step 704 of FIG. 7.

At step 806, the control unit surveys an environment around the vehicle using the one or more light ranging devices to generate ranging data. The environment includes a plurality of environmental surfaces. The ranging data may include distance vectors between the one or more light ranging devices and the plurality of environmental surfaces. Generating the ranging data may include continuously surveying the environment surrounding the vehicle to generate ranging data, as described above in section V(A).

At step 808, the control unit detects a proximity breach when a distance vector to an environmental surface indicates that the environmental surface is within a threshold distance of a first point of the model. Such a proximity detection (e.g., as described above in section V(C)) can identify a region in a model where a change event might have occurred.

At step 810, the control unit determines that the first point is within a first region of the plurality of regions. Step 810 may be performed in a substantially similar fashion as described above with respect to step 712 of FIG. 7.

At step 812, the control unit accesses the memory to retrieve a first semantic label associated with the first region. The control unit may, for example, access a stored mapping of regions to semantic labels. The control unit may compare one or more points in the first region (e.g., the first point, or the points constituting the first region) to a set of points in the mapping, and identify the first semantic label stored in association with the first region.

At step 814, the control unit provides a notification including the first sematic label. Step 814 may be performed in a substantially similar fashion as described above with respect to step 716 of FIG. 7.

VIII. EXAMPLE POINT CLOUD DISPLAYS

FIGS. 9-15 show examples of displays of a vehicle model and point cloud, according to some embodiments. As described above in section III, a virtual camera view of a vehicle may be dynamically displayed, along with a point cloud of surrounding objects. FIGS. 9-13 illustrate various such views, corresponding to different virtual camera poses with respect to the vehicle.

FIG. 9 shows a display of a top-down view of a vehicle model and point cloud 900, according to some embodiments. A model of a vehicle 904 is shown, here from a relatively zoomed-out, top-down view. A point cloud 902 is also shown. The point cloud 902 may include points of different densities and colors to represent different objects at different distances. A set of points 908 may be displayed in yellow to indicate a relatively close object. Another set of points 906 may be displayed in purple to indicate a relatively far object. Another set of points 910 may be displayed in pink to represent an object of intermediate distance. Yet other points 912 may be displayed in white (e.g., to indicate a moving object). Accordingly, different colors (e.g., a first color, second color, etc.) can be used to convey information about the surrounding environment.

FIG. 10 shows a display of a zoomed top-down view of a vehicle model and point cloud 1000, according to some embodiments. A model of a vehicle 1004 is shown, here from a relatively zoomed-in, top-down view. A point cloud 1002 is also shown. The point cloud 1002 may include points of different densities and colors to represent different objects at different distances. A set of points 1006 may be displayed in yellow to indicate a relatively close object. Another set of points 1010 may be displayed in purple to indicate a relatively far object. Another set of points 1008 may be displayed in pink to represent an object of intermediate distance. Yet other points 1012 may be displayed in white (e.g., to indicate a moving object).

FIG. 11 shows a display of a rear aerial view of a vehicle model and point cloud 1100, according to some embodiments. A model of a vehicle 1104 is shown, here from a rear aerial view. A point cloud 1102 is also shown. The point cloud 1102 may include points of different densities and colors to represent different objects at different distances. A set of points 1110 may be displayed in yellow to indicate a relatively close object. Another set of points 1106 may be displayed in purple to indicate a relatively far object. Another set of points 1108 may be displayed in pink to represent an object of intermediate distance. Yet other points 1112 may be displayed in white (e.g., to indicate a moving object).

FIG. 12 shows a display of a front aerial view of a vehicle model and point cloud 1200, according to some embodiments. A model of a vehicle 1204 is shown, here from a front aerial view. A point cloud 1202 is also shown. The point cloud 1202 may include points of different densities and colors to represent different objects at different distances. A set of points 1210 may be displayed in yellow to indicate a relatively close object. Another set of points 1206 may be displayed in purple to indicate a relatively far object. Another set of points 1208 may be displayed in pink to represent an object of intermediate distance. Yet other points 1212 may be displayed in white (e.g., to indicate a moving object).

FIG. 13 shows a display of a rear side view of a vehicle model and point cloud 1300, according to some embodiments. A model of a vehicle 1304 is shown, here from a rear side view. A point cloud 1302 is also shown. The point cloud 1302 may include points of different densities and colors to represent different objects at different distances. A set of points 1308 may be displayed in yellow to indicate a relatively close object. Another set of points 1310 may be displayed in purple to indicate a relatively far object. Another set of points 1306 may be displayed in pink to represent an object of intermediate distance. Yet other points 1312 may be displayed in white (e.g., to indicate a moving object).

FIG. 14 shows an example screenshot of a display 1400 including a vehicle model 1402, point cloud 1404, and interface elements 1406-1412 for accepting user input to modify a view. As described above in sections IV and V, in some implementations, a user can select when to change the virtual camera pose, using a user interface. The user interface may comprise a touch sensitive display. As illustrated in FIG. 14, different views corresponding to different virtual camera poses are shown on interface elements 1406-1410. Element 1406 shows a top-down view of a vehicle at a first zoom level. User selection of element 1406 may cause modification of the virtual camera pose and ensuing view displayed of the vehicle model 1402 and point cloud 1404. Element 1408 shows a top-down view of a vehicle at a second zoom level. User selection of element 1408 may cause modification of the virtual camera pose and ensuing view displayed of the vehicle model 1402 and point cloud 1404. Element 1410 shows an upper rear perspective view of a vehicle. User selection of element 1410 may cause modification of the virtual camera pose and ensuing view displayed of the vehicle model 1402 and point cloud 1404. As shown in FIG. 14, the view corresponding to element 1410 has been selected and is greyed out. The vehicle model 1402 and point cloud 1404 are displayed in an upper rear perspective view corresponding to that shown in the selected element 1410.

The display 1400 further includes a slider 1412 and zoom in/zoom out buttons. Via slider 1412 and/or the zoom buttons, user input can be accepted to adjust the zoom level, which will modify the view of the vehicle model 1402 and point cloud 1404, as illustrated by FIG. 15 in comparison to FIG. 14.

FIG. 15 shows an example screenshot of a display 1500 including a vehicle model 1502, point cloud 1504, and interface elements 1506-1512 for accepting user input to modify a view. The display 1500 is similar to the display 1400 of FIG. 4, but the slider 1512 has been adjusted via user input to zoom in. Responsive to the user input, the computing system has transitioned to a more zoomed-in view of the vehicle model 1502 and the point cloud 1504.

IX. EXAMPLE COMPUTER SYSTEM

Figure 16:
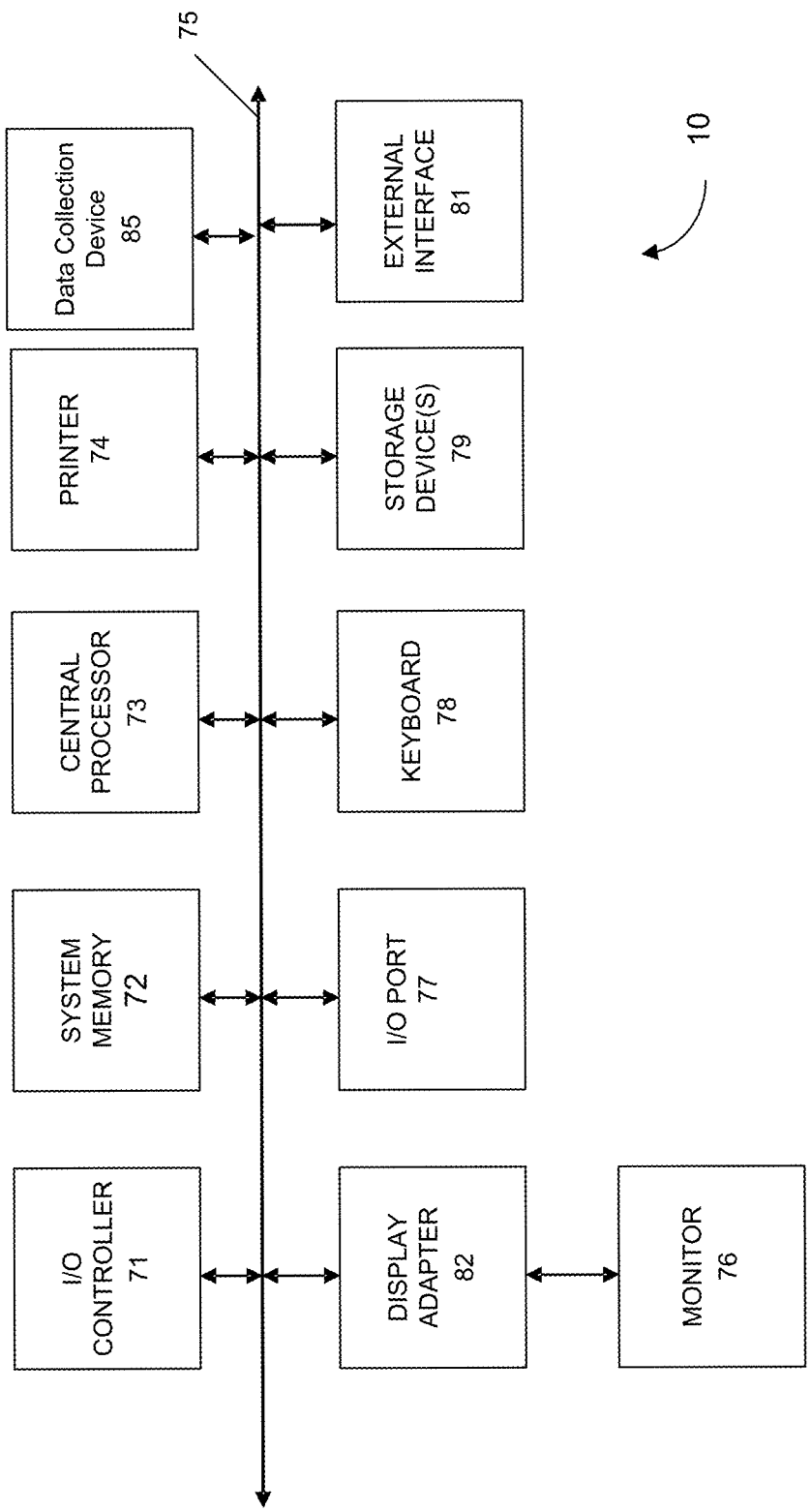
FIG. 16 shows an example of a block diagram of example computer system for implementing various embodiments.

Any of the computer systems (e.g., User Interface Hardware & Software 315) mentioned herein may utilize any suitable number of subsystems. Examples of such subsystems are shown in FIG. 16 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 16 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

X. REFERENCES

Alismail, H., Baker, L. D., & Browning, B. (2014, May). Continuous trajectory estimation for 3D SLAM from actuated lidar. In *Robotics and Automation (ICRA), 2014 IEEE International Conference on* (pp. 6096-6101). IEEE.

Anderson, S., MacTavish, K., & Barfoot, T. D. (2015). Relative continuous-time SLAM. The International Journal of Robotics Research, 34(12), 1453-1479.

Barfoot, T. D., Tong, C. H., & Särkkä, S. (2014, July). Batch Continuous-Time Trajectory Estimation as Exactly Sparse Gaussian Process Regression. In *Robotics: Science and Systems*.

Dubé, R., Sommer, H., Gawel, A., Bosse, M., & Siegwart, R. (2016, May). Non-uniform sampling strategies for continuous correction based trajectory estimation. In *Robotics and Automation (ICRA), 2016 IEEE International Conference on* (pp. 4792-4798). IEEE.

Kohler, D., Hess, W., & Rapp, H. (2016, October) Cartographer is a system that provides real-time simultaneous localization and mapping (SLAM) in 2D and 3D across multiple platforms and sensor configurations. Retrieved from github.com/googlecartographer/cartographer.

Pomerleau, F., Colas, F., & Siegwart, R. (2015). A review of point cloud registration algorithms for mobile robotics. *Foundations and Trends* in Robotics, 4(1), 1-104.

Tam, G. K., Cheng, Z. Q., Lai, Y. K., Langbein, F. C., Liu, Y., Marshall, D., . . . & Rosin, P. L. (2013). Registration of 3D point clouds and meshes: a survey from rigid to nonrigid. *Visualization and computer graphics, IEEE transactions on,* 19(7), 1199-1217.

Zhang, J., & Singh, S. (2014, July). LOAM: Lidar Odometry and Mapping in Real-time. In *Robotics: Science and Systems* (Vol. 2).

Zhang, J., & Singh, S. (2014, November). laserOdometry.cpp. Retrieved from http://web.archive.org/web/20160728191133/http://docs.ros.org/indigo/api/loam_velodyne/html/laserOdometry_8cpp_source.htmlhttp://docs.ros.org/indigo/api/loamvelodyne/html/laserOdometry8cppsource.html.

Zlot, R., & Bosse, M. (2014). Efficient Large-scale Three-dimensional Mobile Mapping for Underground Mines. *Journal of Field Robotics,* 31(5), 758-779.

What is claimed is:

1. A method using a light ranging system, the light ranging system comprising a control unit communicatively coupled with one or more light ranging devices, the one or more light ranging devices providing ranging data that includes a plurality of distance vectors between the one or more light ranging devices and a plurality of environmental surfaces, each distance vector of the plurality of distance vectors corresponding to a pixel of a three-dimensional image stream, the method comprising performing by a computing system:

receiving the ranging data from the one or more light ranging devices via one or more communication channels;

identifying a first pose of a virtual camera relative to the one or more light ranging devices, the first pose defining a first field of view of the virtual camera, wherein the one or more light ranging devices are respectively separated from the first pose by one or more first vectors;

translating a first portion of the plurality of distance vectors using the one or more first vectors, thereby obtaining first translated distance vectors that are within the first field of view of the virtual camera;

displaying, on a display device of the computing system, first pixels of the three-dimensional image stream using first colors associated with the first translated distance vectors at first pixel positions specified by the first translated distance vectors;

receiving an indication of a change in the virtual camera;

in response to the indication of the change in the virtual camera, identifying a second pose of the virtual camera relative to the one or more light ranging devices, the second pose defining a second field of view of the virtual camera, wherein the one or more light ranging devices are respectively separated from the second pose by one or more second vectors;

translating a second portion of the plurality of distance vectors using the one or more second vectors, thereby obtaining second translated distance vectors that are within the second field of view of the virtual camera; and displaying, on the display device of the computing system, second pixels of the three-dimensional image stream using second colors associated with the second translated distance vectors at second pixel positions specified by the second translated distance vectors.

2. The method of claim 1, wherein the indication of the change in the virtual camera is received at a user interface that receives user input corresponding to the indication of the change in the virtual camera.

3. The method of claim 2, wherein the user interface comprises a touch sensitive display.

4. The method of claim 2, wherein the user input specifies a particular one of a plurality of virtual poses of the virtual camera, and wherein the plurality of virtual poses include the first pose and the second pose.

5. The method of claim 4, wherein the plurality of virtual poses are pre-defined, and wherein separation vectors between the one or more light ranging devices and the plurality of virtual poses are stored in a memory of the computing system.

6. The method of claim 1, wherein the one or more light ranging systems are installed on an autonomous object.

7. The method of claim 6, wherein the indication of the change in the virtual camera is received at a trajectory processor that:

determines a trajectory of the autonomous object;

determines that a current pose of the virtual camera is to change based on the trajectory; and determines a new pose of the virtual camera based on the trajectory.

8. The method of claim 7, wherein the trajectory processor is configured to receive trajectory data from the autonomous object, the trajectory data providing the indication of a change in the virtual camera, and wherein the trajectory processor is configured to determine the trajectory of the autonomous object using the trajectory data.

9. The method of claim 8, wherein the trajectory data includes a transmission setting of the autonomous object.

10. The method of claim 7, wherein the trajectory processor is configured to analyze the plurality of distance vectors to determine the trajectory of the autonomous object, the ranging data providing the indication of a change in the virtual camera.

11. The method of claim 1, wherein a color of a pixel is dependent on a distance of a corresponding translated distance vector.

12. The method of claim 1, wherein a color of a pixel is dependent on an intensity of a detected signal.

13. The method of claim 1, wherein the first colors are different from the second colors.

14. A method using a light ranging system, the light ranging system comprising a control unit communicatively coupled with one or more light ranging devices, the method comprising:
   storing a model of an exterior of an object in a memory of the control unit, the model comprising a set of three-dimensional points corresponding to a plurality of regions of the exterior;
   for each region of the plurality of regions of the exterior of the object:
      storing, in the memory, a semantic label in association with a subset of points of the model that define the region;
   surveying an environment of the object using the one or more light ranging devices to generate ranging data, the environment comprising a plurality of environmental surfaces, wherein the ranging data comprise distance vectors between the one or more light ranging devices and the plurality of environmental surfaces;
   detecting a proximity breach when a distance vector to an environmental surface indicates that the environmental surface is within a threshold distance of a first point of the model;
   determining the first point is within a first region of the plurality of regions;
   access the memory to retrieve a first semantic label associated with the first region; and
   provide a notification including the first semantic label.

15. The method of claim 14, wherein the model includes one or more model positions of the one or more light ranging devices.

16. The method of claim 14, wherein the plurality of regions are non-overlapping.

17. The method of claim 14, wherein the notification is provided to one or more of a driver's mobile device, a local memory, or a server computer over a network.

18. The method of claim 14, wherein the exterior is the exterior of an autonomous object.

19. A method using a light ranging system, the light ranging system comprising a control unit communicatively coupled with one or more light ranging devices, the method comprising:
   storing a primary model of an exterior of an object in a memory of the control unit, the primary model comprising a set of three-dimensional points corresponding to a plurality of regions on the exterior of the object;
   for each region of the plurality of regions on the exterior of the object:
      storing, in the memory, a semantic label in association with a subset of points of the primary model that define the region;
   performing, using the one or more light ranging devices, one or more measurements of the exterior of the object to generate ranging data that includes distances from the exterior of the object to the one or more light ranging devices;
   constructing, by the control unit, one or more secondary models of the exterior of the object using the ranging data; and
   comparing, by the control unit, the one or more secondary models with the primary model to detect a first point having a change in the exterior of the object;
   determining the first point is within a first region of the plurality of regions;
   access the memory to retrieve a first semantic label associated with the first region; and
   provide a notification including the first semantic label.

20. The method of claim 19, wherein the primary model includes one or more model positions of the one or more light ranging devices.

21. The method of claim 19, wherein the plurality of regions are non-overlapping.

22. The method of claim 19, wherein the exterior is the exterior of an autonomous object.

* * * * *